United States Patent
Ono et al.

(10) Patent No.: US 10,012,977 B2
(45) Date of Patent: Jul. 3, 2018

(54) CONTROL DEVICE, CONTROL METHOD, INFORMATION PROCESSING PROGRAM, AND RECORDING MEDIUM

(71) Applicant: OMRON Corporation, Kyoto-shi, Kyoto (JP)

(72) Inventors: Yasushi Ono, Kusatsu (JP); Mamoru Egi, Otsu (JP); Yasutomo Kawanishi, Kusatsu (JP); Yasumoto Mori, Joyo (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/341,494

(22) Filed: Nov. 2, 2016

(65) Prior Publication Data
US 2017/0146981 A1 May 25, 2017

(30) Foreign Application Priority Data
Nov. 19, 2015 (JP) .................................. 2015-226722

(51) Int. Cl.
| | | |
|---|---|---|
| G05B 11/18 | (2006.01) | |
| G05B 19/416 | (2006.01) | |
| G05B 11/42 | (2006.01) | |
| H02P 29/00 | (2016.01) | |

(52) U.S. Cl.
CPC ............ *G05B 19/416* (2013.01); *G05B 11/42* (2013.01); *H02P 29/00* (2013.01); *G05B 2219/13095* (2013.01); *G05B 2219/34013* (2013.01); *H02P 2205/05* (2013.01)

(58) Field of Classification Search
CPC .......... G05B 2219/34013; G05B 11/42; G05B 2219/13095; H02P 2205/05; H02P 29/00
See application file for complete search history.

(56) References Cited

U.S. PATENT DOCUMENTS

| | | | |
|---|---|---|---|
| 9,593,767 B2 * | 3/2017 | Tsukizaki | ................ B60L 15/20 |
| 2011/0043159 A1 | 2/2011 | Shoda et al. | |
| 2014/0117918 A1 | 5/2014 | Park | |

FOREIGN PATENT DOCUMENTS

| | | |
|---|---|---|
| EP | 2362536 A2 | 8/2011 |
| JP | 2011-176906 A | 9/2011 |

* cited by examiner

*Primary Examiner* — Karen Masih
(74) *Attorney, Agent, or Firm* — Metrolexis Law Group, PLLC

(57) ABSTRACT

A control device, by which a user causes a servo motor to perform desired operation without being conscious of a maximum torque of the servo motor while easily understanding the transmission characteristic, selects which one of sliding mode control and PID control is adopted to control a servo motor based on at least one of a position deviation and a velocity deviation.

12 Claims, 22 Drawing Sheets

CONTROL DEVICE, CONTROL METHOD, INFORMATION PROCESSING PROGRAM, AND RECORDING MEDIUM

CROSS-REFERENCE TO RELATED APPLICATION

This application is based on Japanese Patent Application No. 2015-226722 filed with the Japan Patent Office on Nov. 19, 2015, the entire contents of which are incorporated herein by reference.

FIELD

The present invention relates to a control device that controls drive of a motor such as a servo motor.

BACKGROUND

Proportional-integral-differential (PID) control that controls a servo motor such that the position and velocity of the servo motor follow an externally-input position command value and an externally-input velocity command value has been known as a servo motor controlling method. Similarly to the PID control, sliding mode control has been known as the motor controlling method. For example, Unexamined Japanese Patent Publication No. 2011-176906 (published on Sep. 8, 2011) discloses a motor controlling device implementing sliding mode control that controls the position and velocity of a rotor along a sliding curve fixed with a physical variable used in orientation control, thereby stopping the rotor at a target position.

For the PID control, although a user easily recognizes a transmission characteristic, a problem such as overshoot and hunting occurs in the case that a torque to be output is limited. On the other hand, for the sliding mode control, although the control can be implemented such that the overshoot and the hunting do not occur, the user hardly understands the transmission characteristic of a sliding mode controller since the transmission characteristic is nonlinear.

SUMMARY

An object of the present invention is to provide a control device, a control method, and a program, by which a user causes a servo motor to perform desired operation without being conscious of a maximum torque of the servo motor while easily understanding the transmission characteristic.

According to one aspect of the present invention, a control device for controlling a servo motor or a reference model servo motor to be used for implementing model following control on the servo motor includes: a sliding mode controller configured to implement sliding mode control that determines a torque to be output to the servo motor such that a position deviation indicating a deviation of a position of the servo motor from an externally input position command value and a velocity deviation indicating a deviation of a velocity of the servo motor from an externally input velocity command value converge onto a switching curve determined from a predetermined torque that can be output from the servo motor and a motion characteristic of a load machine to be driven by the servo motor; a proportional-integral-derivative (PID) controller configured to implement PID control such that the position and velocity of the servo motor follow the position command value and velocity command value; and a selector configured to select the control by the sliding mode controller or the control by the PID controller, based on at least one of the position deviation and the velocity deviation.

According to the above configuration, the control device selectively implements the sliding mode control and the PID control. At this point, under the sliding mode control, the user can cause the servo motor to perform desired operation by providing only the command (position command value) associated with the position of the servo motor or reference model without being conscious of the maximum torque that can be output from the servo motor. In the PID control, the user easily understands the transmission characteristic. Accordingly, when the control device selectively implements the sliding mode control and the PID control, the user easily understands the transmission characteristic, and the user can cause the servo motor to perform the desired operation without being conscious of the maximum torque that can be output from the servo motor.

According to the above configuration, the control device selects the control by the sliding mode controller or the control by the PID controller, based on at least one of the position deviation and the velocity deviation. Therefore, the control device can select the proper control method (the sliding mode control or the PID control) according to the controlled variable.

Preferably, in the control device, the sliding mode controller and the PID controller are configured to control the reference model servo motor, and the control device further includes a feedback controller configured to implement the PID control on the actual position and velocity of the servo motor such that the actual position and velocity of the servo motor follow a position and velocity of the reference model servo motor to be controlled by the sliding mode controller or the PID controller selected by the selector.

According to the above configuration, the control device can implement the PID control on the servo motor using the reference model by which the user easily understands the transmission characteristic while being able to cause the servo motor to perform the desired operation without being conscious of the maximum torque that can be output from the servo motor.

Preferably, in the control device, the selector selects the PID controller when the torque controlled by the PID controller is equal to or less than a first predetermined value or when the velocity deviation is equal to or less than a second predetermined value, and the selector selects the sliding mode controller when the torque controlled by the PID controller is more than the first predetermined value or when the velocity deviation is more than the second predetermined value.

According to the above configuration, in the control device, the selector selects the PID controller when the torque controlled by the PID controller is equal to or less than the first predetermined value or when the velocity deviation is equal to or less than the second predetermined value, and the selector selects the sliding mode controller when the torque controlled by the PID controller is more than the first predetermined value or when the velocity deviation is more than the second predetermined value. Accordingly, when the control device selectively implements the sliding mode control and the PID control using the first predetermined value and the second predetermined value, the user easily understands the transmission characteristic, and the user can cause the servo motor to perform the desired operation without being conscious of the maximum torque that can be output from the servo motor.

Preferably, in the control device, the first predetermined value is a maximum torque output from the servo motor, the selector selects the PID controller when the torque output from the PID controller is equal to or less than the maximum torque of the servo motor, and the selector selects the sliding mode controller when the torque output from the PID controller is more than the maximum torque.

According to the above configuration, in the control device, when the torque output from the PID controller is equal to or less than the maximum torque, the PID controller can control the torque of the servo motor, and the sliding mode control can prevent the overshoot and the hunting from occurring in the servo motor.

Preferably, in the control device, the selector translates the switching curve such that the switching curve is in contact with a straight line drawn on a phase plane, in which a vertical axis indicates the position deviation while a horizontal axis indicates the velocity deviation, when the torque controlled by the PID controller is the maximum torque, and causes the sliding mode controller to implement the sliding mode control such that the position deviation and the velocity deviation converge onto the translated switching curve.

According to the above configuration, when the torque controlled by the PID controller is equal to or less than the maximum torque, the control device can cause the PID controller to control the torque of the servo motor, and cause the sliding mode controller to implement the sliding mode control such that the position deviation and the velocity deviation converge onto the translated switching curve.

Preferably, in the control device, in the case where the velocity deviation controlled by the PID controller is equal to or less than the second predetermined value, the selector selects the PID controller, and in the case where the velocity deviation controlled by the PID controller is more than the second predetermined value, the selector translates the switching curve such that the switching curve is in contact with a straight line drawn on a phase plane, in which a vertical axis indicates the position deviation while a horizontal axis indicates the velocity deviation, when the torque controlled by the PID controller is zero at a place where the velocity deviation is the second predetermined value, and causes the sliding mode controller to implement the sliding mode control such that the position deviation and the velocity deviation converge onto the translated switching curve.

According to the above configuration, since the control device can smoothly change the torque of the servo motor from the control by the sliding mode controller to the control by the PID controller, the torque of the servo motor can smoothly be changed, and the sliding mode control can prevent the overshoot and the hunting from occurring in the servo motor or the reference model.

Preferably, in the control device, a buffer area is an area sandwiched between a minimally-translated translation switching curve and a maximally-translated switching curve, the minimally-translated translation switching curve and the maximally-translated switching curve being obtained by translating the switching curve such that the switching curve is in contact with a minimum torque straight line and a maximum torque straight line at a place where the velocity deviation is the second predetermined value, respectively, the minimum torque straight line being a straight line drawn on the phase plane when the torque controlled by the PID controller is a minimum torque output from the servo motor, the maximum torque straight line being a straight line drawn on the phase plane when the torque controlled by the PID controller is a maximum torque output from the servo motor.

According to the above configuration, in the control device, the area sandwiched between the minimally-translated translation switching curve and the maximally-translated switching curve can be set to the buffer area.

Preferably, in the control device, the selector selects the PID controller when the velocity deviation controlled by the PID controller is equal to or less than the second predetermined value, and the selector selects the sliding mode controller when the velocity deviation controlled by the PID controller is more than the second predetermined value.

According to the above configuration, in the control device, when the velocity deviation controlled by the PID controller is more than the second predetermined value, the sliding mode controller controls the torque of the servo motor, so that time necessary to match the position and velocity of the servo motor with the position command value and the velocity command value can be shortened, and the sliding mode control can prevent the overshoot and the hunting from occurring in the servo motor or the reference model.

Preferably, in the control device, the velocity command value is zero.

According to the above configuration, in the control device, since the velocity command value is zero, the velocity of the servo motor also becomes zero at a point of time the position of the servo motor arrives at the target position indicated by the position command value, and the position of the servo motor does not overshoot.

Preferably, in the control device, the velocity of the servo motor controlled by the sliding mode controller or the PID controller is less than a maximum output velocity of the servo motor.

According to the above configuration, in the control device, the velocity of the servo motor controlled by the sliding mode controller or the PID controller is less than the maximum output velocity of the servo motor.

At this point, when a velocity larger than the maximum output velocity of the servo motor is set to the velocity of the servo motor controlled by the sliding mode controller or the PID controller, the servo motor does not follow.

In the control device, the velocity of the servo motor controlled by the sliding mode controller or the PID controller is less than the maximum output velocity of the servo motor, so that the control device can control the servo motor using the controlled velocity that can be followed by the servo motor.

According to another aspect of the present invention, a control method for controlling a servo motor or a reference model servo motor to be used for implementing model following control on the servo motor includes: a sliding mode control step of implementing sliding mode control that determines a torque to be output to the servo motor such that a position deviation indicating a deviation of a position of the servo motor from an externally input position command value and a velocity deviation indicating a deviation of a velocity of the servo motor from an externally input velocity command value converge onto a switching curve determined from a predetermined torque that can be output from the servo motor and a motion characteristic of a load machine to be driven by the servo motor; a PID control step of implementing PID control such that the position and velocity of the servo motor follow the position command value and velocity command value; and a selection step of selecting the control in the sliding mode control step or the control in the PID control step for the torque of the servo motor, based on the position deviation and velocity deviation of the servo motor.

According to the above configuration, in the control method, the sliding mode control and the PID control are selectively implemented. At this point, under the sliding mode control, the user can cause the servo motor to perform desired operation by providing only the command (position command value) associated with the position of the servo motor or reference model without being conscious of the maximum torque that can be output from the servo motor. In the PID control, the user easily understands the transmission characteristic. Accordingly, in the control method, when the sliding mode control and the PID control are selectively implemented, the user easily understands the transmission characteristic, and the user can cause the servo motor to perform the desired operation without being conscious of the maximum torque that can be output from the servo motor.

According to the above configuration, in the control method, the sliding the mode control or the PID control is selected based on at least one of the position deviation and the velocity deviation. Therefore, in the control device, the proper control (the sliding mode control or the PID control) can be selected according to the controlled variable.

According to one aspect of the present invention, with respect to the servo motor control device and the like, the user easily understands the transmission characteristic while being able to cause the servo motor to perform the desired operation without being conscious of the maximum torque that can be output from the servo motor.

DETAILED DESCRIPTION

First Embodiment

Figure 1:
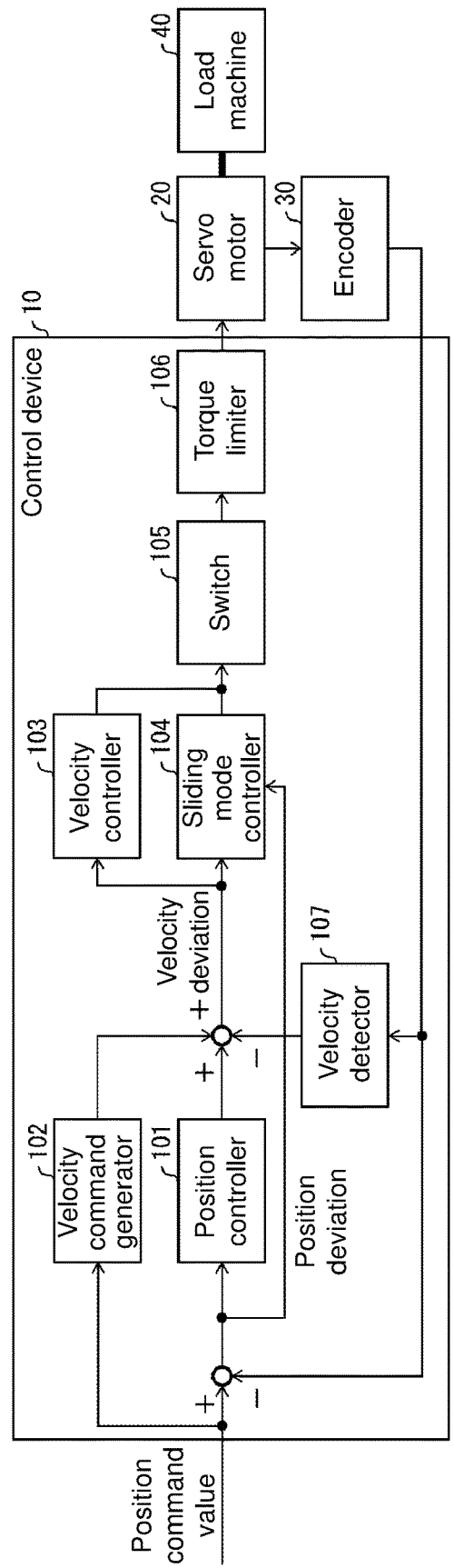
FIG. 1 is a block diagram illustrating a configuration of a main portion of a control device according to a first embodiment of the present invention.

Hereinafter, a first embodiment of the present invention will be described in detail with reference to FIGS. 1 to 23. In the drawings, the identical or equivalent component is designated by the identical symbol. Although described in detail with reference to FIG. 5, a control device 10 can be used as not only a control device that controls a real servo motor 20R (servo motor) of an actual servo motor, but also a control device that controls a model servo motor 20M of a reference model in order to implement model following control on the real servo motor 20R. FIG. 5 illustrates an example in which the control device 10 is used as the control device that controls the model servo motor 20M of the reference model in order to implement the model following control on the real servo motor 20R, namely, a feedforward control device. However, the control device 10 cam also be used as the control device that directly controls the real servo motor 20R.

Hereinafter, unless otherwise specified, the real servo motor 20R and the model servo motor 20M are collectively referred to as a "servo motor 20". Similarly, unless otherwise specified, a real load machine 40R and a model load machine 40M that is a reference model of the real load machine 40R are collectively referred to as a "load machine 40".

In order to facilitate understanding of the control device 10 of the embodiment, a conventional sliding mode control device 90 will be described with reference to FIG. 24.

Outline of Conventional Control Device

Figure 24:
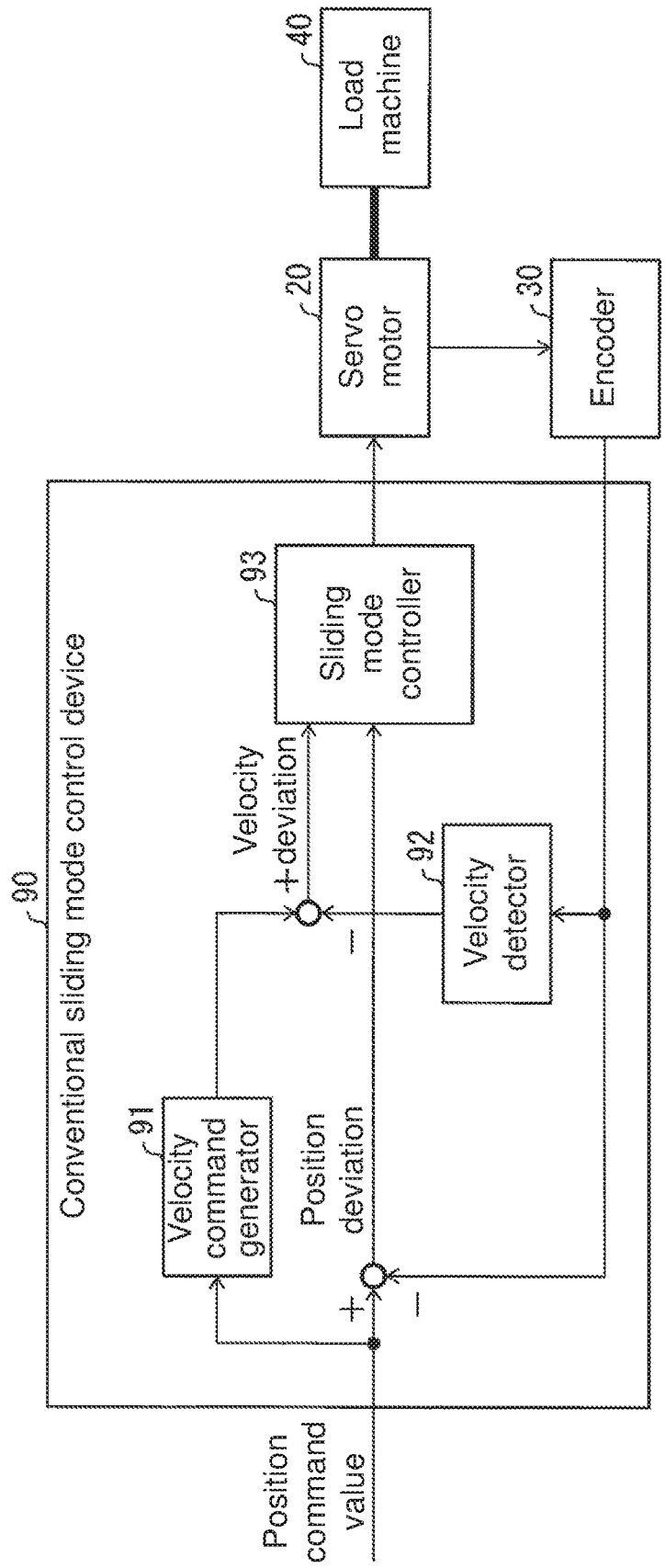
FIG. 24 is a view illustrating an outline of a conventional control device.

FIG. 24 is a view illustrating an outline of the conventional sliding mode control device 90 that is an example of a conventional control device. FIG. 24 illustrates a servo motor 20 that is controlled by the conventional sliding mode control device 90, an encoder 30 that detects a position of the servo motor 20, and a load machine 40 that is driven by the servo motor 20.

The servo motor 20 is controlled by the conventional sliding mode control device 90 to drive the load machine 40. The encoder 30 detects the position of the servo motor 20, for example, a rotation angle of the servo motor 20. The encoder 30 transmits the detected position to the conventional sliding mode control device 90. The encoder 30 may transmit a velocity of the servo motor 20 and transmit the detected velocity to the conventional sliding mode control device 90. In this case, the conventional sliding mode control device 90 needs not to include a velocity detector 92 that calculates the velocity of the servo motor 20 from the position (feedback position $\theta_{fb}$) of the servo motor 20, the position of the servo motor 20 being detected with the encoder 30.

The conventional sliding mode control device 90 includes a velocity command generator 91, a velocity detector 92, and a sliding mode controller 93. The velocity command generator 91 receives a position command value $\theta_R$ provided from the outside (for example, from a user), and generates a velocity command value $v_R$ from the position command value $\theta_R$. The velocity command generator 91 outputs the generated velocity command value $v_R$. The velocity detector 92 calculates a feedback velocity $v_{fb}$ based on the feedback position $\theta_{fb}$ from the encoder 30, and outputs the calculated feedback velocity $v_{fb}$.

The sliding mode controller 93 receives the position command value $\theta_R$, the velocity command value $v_R$ generated from the position command value $\theta_R$ with the velocity command generator 91, the feedback position $\theta_{fb}$ detected with the encoder 30, and the feedback velocity $v_{fb}$ calculated with the velocity detector 92 based on the feedback position $\theta_{fb}$. More particularly, the sliding mode controller 93 receives a position deviation $\theta_{err}$ that is a deviation between the position command value $\theta_R$ and the feedback position $\theta_{fb}$ and a velocity deviation $v_{err}$ that is a deviation between the velocity command value $v_R$ and the feedback velocity $v_{fb}$. The sliding mode controller 93 implements sliding mode control on the servo motor 20 with the position deviation $\theta_{err}$ and the velocity deviation $v_{err}$ as a switching curve.

Generally, the sliding mode control has a feature that the control can be implemented such that a problem such as overshoot and hunting does not occur, at the same time the user hardly understands a transmission characteristic of the sliding mode controller because the transmission characteristic is nonlinear. The PID control, in which the user easily recognizes the transmission characteristic, has a problem that the problem such as overshoot and hunting can occur in the case that a torque to be output is limited.

The control device 10 of the embodiment switches between the PID control and the sliding mode control in a specific area. Accordingly, the control device 10 establish both the characteristic of the PID control that the user easily understands the characteristic to easily draw a desired orbit of the user and the characteristic of the sliding mode control that the orbit can automatically be drawn while the setting torque limiting value is used at the maximum in the case that a command exceeding the setting torque limiting value is given.

An outline of a difference between the control device 10 and the conventional sliding mode control device 90 that implements only the sliding mode control can be expressed as follows. The control device 10 includes a sliding mode controller 104, a position controller 101 and a velocity controller 103 (PID controller), and a switch 105 (selector). The sliding mode controller 104 implements the sliding mode control that determines the torque output to the servo motor 20 such that the position deviation $\theta_{err}$ indicating the deviation of the position of the servo motor 20 from the externally input position command value $\theta_R$ and the velocity deviation $v_{err}$ indicating the deviation of the velocity of the servo motor 20 from the velocity command value $v_R$ converge onto a switching curve SL determined by a predetermined torque (for example, a maximum torque τmax (τmin)) that can be output from the servo motor 20 and a motion characteristic of the load machine 40 driven by the servo motor 20. The position controller 101 and the velocity controller 103 (PID controller) implement the PID control such that the position and velocity of the servo motor 20 follow the position command value $\theta_R$ and the velocity command value $v_R$. The switch 105 (selector) selects the control by the sliding mode controller 104 or the control by the position controller 101 and velocity controller 103, based on at least one of the position deviation $\theta_{err}$ and the velocity deviation $v_{err}$.

Hereinafter, the position controller 101 and the velocity controller 103 are collectively referred to as a "PID controller". As described above, the control device 10 is the control device that controls the real servo motor 20R (servo motor) or the model servo motor 20M of the reference model in order to implement the model following control on the real servo motor 20R. Accordingly, the "servo motor 20" means the real servo motor 20R or the model servo motor 20M. Similarly, the "load machine 40" means the real load machine 40R or the model load machine 40M.

According to the above configuration, the control device 10 selectively implements the sliding mode control by the sliding mode controller 104 and the PID control by the PID controller (the position controller 101 and the velocity controller 103). At this point, under the sliding mode control, the user can cause the servo motor 20 to perform desired operation by providing only the command (position command value $\theta_R$) associated with the position of the servo motor 20 or reference model without being conscious of the maximum torque τmax that can be output from the servo motor 20. In the PID control, the user easily understands the transmission characteristic. Accordingly, when the control device 10 selectively implements the sliding mode control and the PID control, the user easily understands the transmission characteristic, and the user can cause the servo motor 20 to perform the desired operation without being conscious of the maximum torque τmax that can be output from the servo motor 20.

According to the above configuration, the control device 10 selects the control by the sliding mode controller 104 or the control by the PID controller (that is, the position controller 101 and the velocity controller 103) based on at least one of the position deviation $\theta_{err}$ and the velocity deviation $v_{err}$. Therefore, the control device 10 can select the proper control method (the sliding mode control or the PID control) according to the controlled variable.

Preferably, in the control device 10, the switch 105 selects the PID controller when the torque controlled by the PID controller (that is, the position controller 101 and the velocity controller 103) is equal to or less than the first predetermined value (for example, a value which is equal to or less than the maximum torque τmax that can be output from the servo motor 20, and is equal to or more than the negative maximum torque, namely, the minimum torque τmin) or when an absolute value of the velocity deviation $v_{err}$ is equal to or less than the second predetermined value, and the switch 105 selects the sliding mode controller 104 when the torque controlled by the PID controller is more than the first predetermined value or when the velocity deviation $v_{err}$ is more than the second predetermined value. The case that the motor operating direction is positive will be described below, and the similar operation is performed in the case that the motor operating direction is negative.

According to the above configuration, in the control device 10, the switch 105 selects the PID controller when the torque controlled by the PID controller is equal to or less than the first predetermined value or when the velocity deviation $v_{err}$ is equal to or less than the second predetermined value, and the switch 105 selects the sliding mode controller 104 when the torque controlled by the PID controller is more than the first predetermined value or when the velocity deviation $v_{err}$ is more than the second predetermined value. Accordingly, when the control device 10 selectively implements the sliding mode control and the PID control using the first predetermined value and the second predetermined value, the user easily understands the transmission characteristic, and the user can cause the servo motor 20 to perform the desired operation without being conscious of the maximum torque τmax that can be output from the servo motor 20.

The control device, described in Unexamined Japanese Patent Publication No. 2011-176906, which implements the sliding mode control causing the rotor to stop at the target position when the rotation velocity of the rotor of the motor becomes the orientation velocity. On the other hand, the control device 10 selects the PID control or the sliding mode control with respect to the position and velocity of the servo motor 20 based on at least one of the position deviation $\theta_{err}$ and the velocity deviation $v_{err}$. The control device, described in Unexamined Japanese Patent Publication No. 2011-176906, implements the sliding mode control in a whole period of a position control mode in which a control target is positioned. On the other hand, the control device 10 switches from the sliding mode control to the PID control according to a predetermined condition during the period of the position control mode, and performs the positioning in the state of the PID control.

The first predetermined value is not necessarily the maximum torque τmax (or the negative maximum torque, namely, the minimum torque τmin) that can be output from the servo motor 20. There is no particular limitation to the first predetermined value as long as the first predetermined value is a predetermined torque that can be output from the servo motor 20. The control device 10 of which the outline is described above will be described in detail below with reference to FIG. 1.

(Detailed Control Device of the Embodiment of the Present Invention)

FIG. 1 is a block diagram illustrating a configuration of a main portion of the control device 10. The control device 10 is a control device that controls the servo motor 20, and includes the position controller 101, a velocity command generator 102, the velocity controller 103, the sliding mode controller 104, the switch 105, a torque limiter 106, and a velocity detector 107.

The velocity command generator 102 receives a position command value $\theta_R$ provided from the outside (for example, from a user), and generates a velocity command value $v_R$ from the position command value $\theta_R$. The velocity command generator 102 outputs the generated velocity command value $v_R$ to the velocity controller 103 and the sliding mode controller 104.

The velocity detector 107 calculates the velocity (feedback velocity $v_{fb}$) of the servo motor 20 from the position (feedback position $\theta_{fb}$) of the servo motor 20, the position of the servo motor 20 being detected with the encoder 30. The velocity detector 107 outputs the calculated feedback velocity $v_{fb}$ to the velocity controller 103 and the sliding mode controller 104.

The position controller 101 and the velocity controller 103 implement the PID control on the servo motor 20. That is, the position controller 101 receives the position command value $\theta_R$ and the position (feedback position $\theta_{fb}$) of the servo motor 20 that is detected by the encoder 30, and implements the control such that the feedback position $\theta_{fb}$ follows the position command value $\theta_R$ (PID control). The position controller 101 may receive the position deviation $\theta_{err}$ that is the deviation between the position command value $\theta_R$ and the feedback position $\theta_{fb}$, and generate a signal (velocity control signal) controlling the velocity of the servo motor 20 based on the position deviation $\theta_{err}$.

The velocity controller 103 receives the velocity control signal generated by the position controller 101 based on the position deviation $\theta_{err}$, the velocity command value $v_R$ generated by the velocity command generator 102, and the feedback velocity $v_{fb}$ calculated with the velocity detector 107. The velocity controller 103 generates a signal controlling the torque of the servo motor 20 based on the velocity control signal, the velocity command value $v_R$, and the velocity deviation $v_{err}$ that is the deviation with the feedback velocity $v_{fb}$. That is, the velocity controller 103 generates the signal controlling the torque of the servo motor 20 such that the feedback velocity $v_{fb}$ follows the velocity control signal and the velocity command value $v_R$ (PID control).

The sliding mode controller 104 receives the position command value $\theta_R$ and the feedback position $\theta_{fb}$ detected with the encoder 30, particularly receives the position deviation $\theta_{err}$ that is the deviation between the position command value $\theta_R$ and the feedback position $\theta_{fb}$. The sliding mode controller 104 receives the velocity control signal generated by the position controller 101 based on the position deviation $\theta_{err}$, the velocity command value $v_R$ generated by the velocity command generator 102, and the feedback velocity $v_{fb}$ calculated with the velocity detector 107, particularly receives the velocity control signal, the velocity command value $v_R$, and the velocity deviation $v_{err}$ that is the deviation with the feedback velocity $v_{fb}$. The sliding mode controller 104 generates the signal controlling the torque of the servo motor 20 such that the position deviation $\theta_{err}$ and the velocity deviation $v_{err}$ converge onto the switching curve SL (switching plane). At this point, the switching curve SL is determined by the predetermined torque that can be output from the servo motor 20 (for example, the maximum torque τmax that can be output from the servo motor 20) and the motion characteristic of the load machine 40 driven by the servo motor 20. The switching curve SL will be described in detail later with reference to FIG. 4.

The switch 105 selects the control by the sliding mode controller 104 or the control by the PID controller (that is, the position controller 101 and the velocity controller 103) for the servo motor 20 based on at least one of the position deviation $\theta_{err}$ and the velocity deviation $v_{err}$. The PID controller implements one of the P control, PI control, PD control, and PID control. A switching technique of the switch 105 will be described in detail later with reference to FIGS. 8 to 22B.

The torque limiter 106 controls the torque of the servo motor 20 based on the signal (the signal controlling the torque of the servo motor 20) generated by the PID controller (that is, the position controller 101 and the velocity controller 103) or the sliding mode controller 104.

A method for controlling the servo motor 20, which is performed with the control device 10 having the configuration described in detail above, can be summarized as follows. That is, the control method performed with the control device 10 is the control method for controlling the real servo motor 20R or the model servo motor 20M of the reference model in order to implement the model following control on the real servo motor 20R. A control method performed with the control device 10 includes the steps of: implementing the sliding mode control to determine the torque output to the servo motor 20 such that the externally-input position command value $\theta_R$, the externally-input velocity command value $v_R$, a position deviation $\theta_{err}$ indicating the deviation of the position with the servo motor 20, and the velocity deviation $v_{err}$ indicating the deviation of the velocity with the servo motor 20 converge onto the switching curve SL determined by a predetermined torque (for example, the maximum torque τmax (τmin) that can be output from the servo motor 20) that can be output from the servo motor 20 and the motion characteristic of the load machine 40 driven by the servo motor 20; implementing PID control such that the position and the velocity of the servo motor 20 follow the position command value $\theta_R$ and the velocity command value $v_R$; and selecting the control implemented in the sliding mode control step or the control implemented in the PID control step with respect to the torque of the servo motor 20 using the position deviation $\theta_{err}$ and the velocity deviation $v_{err}$ of the servo motor 20.

The PID control step is the processing performed with the PID controller, namely, the processing with the position controller 101 and the velocity controller 103. The sliding mode control step is the processing performed with the sliding mode controller 104.

According to the above configuration, in the control method, the sliding mode control and the PID control are selectively implemented. At this point, under the sliding mode control, the user can cause the servo motor 20 to perform desired operation by providing only the command (position command value $\theta_R$) associated with the position of the servo motor 20 or reference model without being conscious of the maximum torque τmax that can be output from the servo motor 20. In the PID control, the user easily understands the transmission characteristic. Accordingly, in the control method, when the sliding mode control and the PID control are selectively implemented, the user easily understands the transmission characteristic, and the user can cause the servo motor 20 to perform the desired operation without being conscious of the maximum torque τmax that can be output from the servo motor 20.

According to the above configuration, in the control method, the control by the sliding mode controller 104 or the control by the PID controller is selected based on at least one of the position deviation $\theta_{err}$ and the velocity deviation $v_{err}$. Therefore, in the control device, the proper control (the sliding mode control or the PID control) can be selected according to the controlled variable.

Effect of Control of Control Device of the Embodiment

A control result of the case that the control device 10 having the above configuration actually controls the servo motor 20 will be described below in comparison with the case that the servo motor 20 is controlled only by the PID control and the case that the servo motor 20 is controlled only by the sliding mode control.

Figure 2:
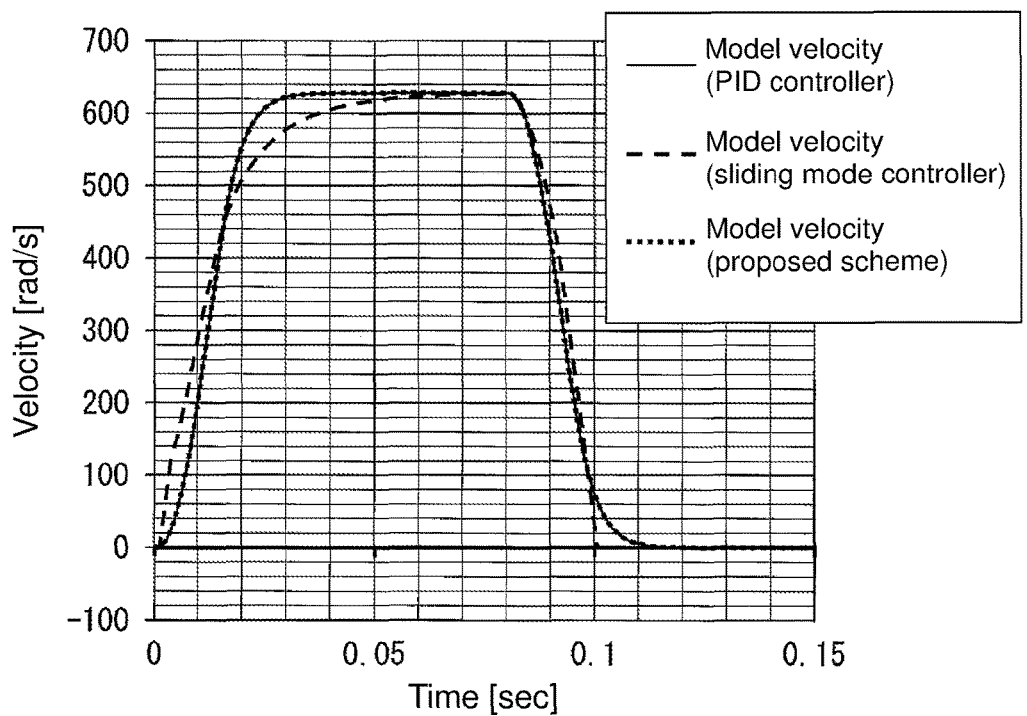
FIG. 2 is a view illustrating a locus of a controlled velocity during unsaturation of a manipulated variable, and is a graph illustrating comparison of the case of only PID control, the case of only sliding mode control, and the case of control implemented by the control device in FIG. 1.

FIG. 2 is a view illustrating a locus of the controlled velocity (the model velocity of the servo motor 20) during unsaturation of a manipulated variable, and is a graph illustrating comparison of the case of only PID control (PID controller), the case of only sliding mode control (sliding mode controller), and the case of the control by the control device 10 (proposed scheme).

Figure 3:
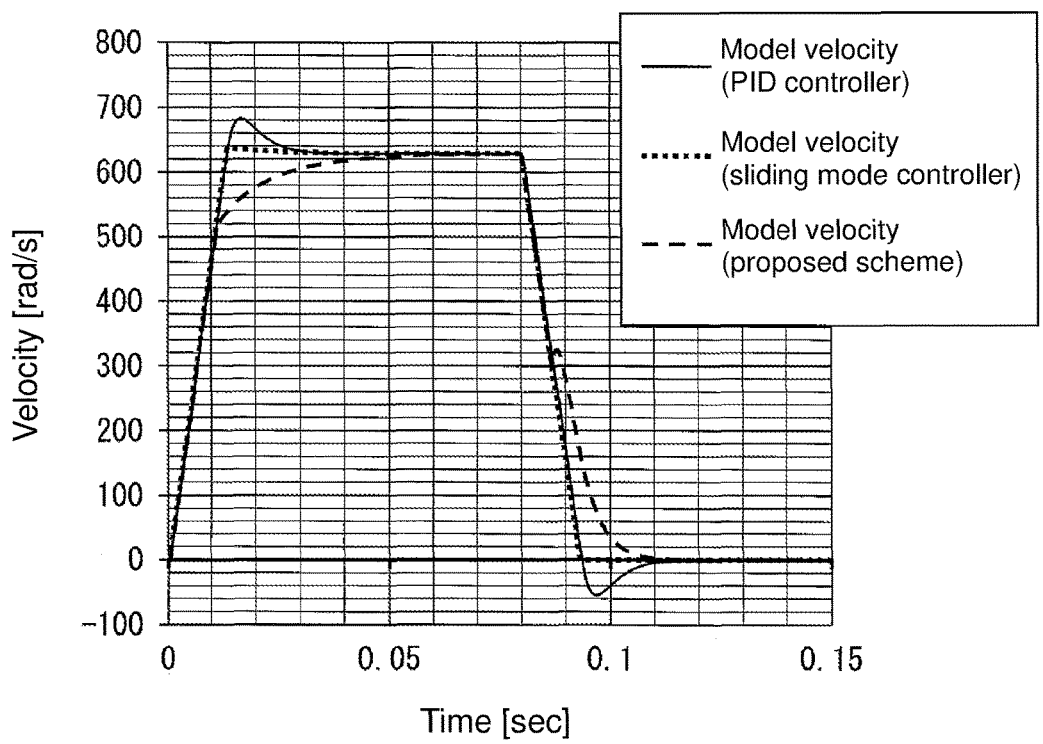
FIG. 3 is a view illustrating the locus of the controlled velocity during saturation of the manipulated variable, and is a graph illustrating the comparison of the case of only the PID control, the case of only the sliding mode control, and the case of the control implemented by the control device in FIG. 1.

FIG. 3 is a view illustrating a locus of the controlled velocity during saturation of the manipulated variable, and is a graph illustrating comparison of the case of only PID control (PID controller), the case of only sliding mode control (sliding mode controller), and the case of the control by the control device 10 (proposed scheme).

That is, FIGS. 2 and 3 illustrate control results (loci) of model velocity by each controller in the case that the manipulated variable, namely, the output torque (a model torque of the servo motor 20 controlled by each controller) of the controller (the PID controller, the sliding mode controller, and the control device 10) is not saturated and the case that the manipulated variable is saturated, respectively.

As illustrated in FIG. 2, when the manipulated variable is not saturated, the control result (locus) of the model velocity indicating the control (proposed scheme) implemented by the control device 10 tracks the same orbit as the control result of the model velocity implemented only by the PID control.

FIG. 3 illustrates the control result in which the overshoot occurs only by the PID control when the manipulated variable is saturated. However, in the control (proposed scheme) implemented by the control device 10, the positioning can be performed without the occurrence of the overshoot even if the manipulated variable is saturated.

FIGS. 2 and 3 illustrate the loci (control results) of the model velocity for the model following control, and the similar control result is obtained for the control in which the model is not used.

Sliding Mode Control

Figure 4:
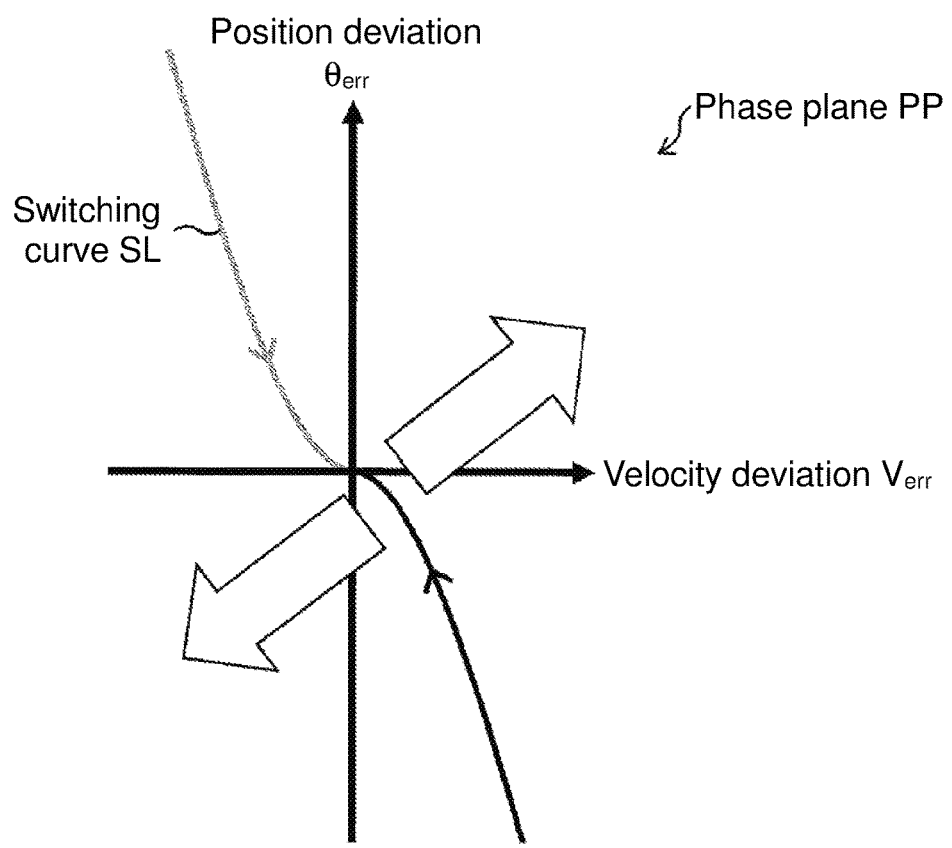
FIG. 4 is a view illustrating the sliding mode control implemented by the control device in FIG. 1.
Figure 5:
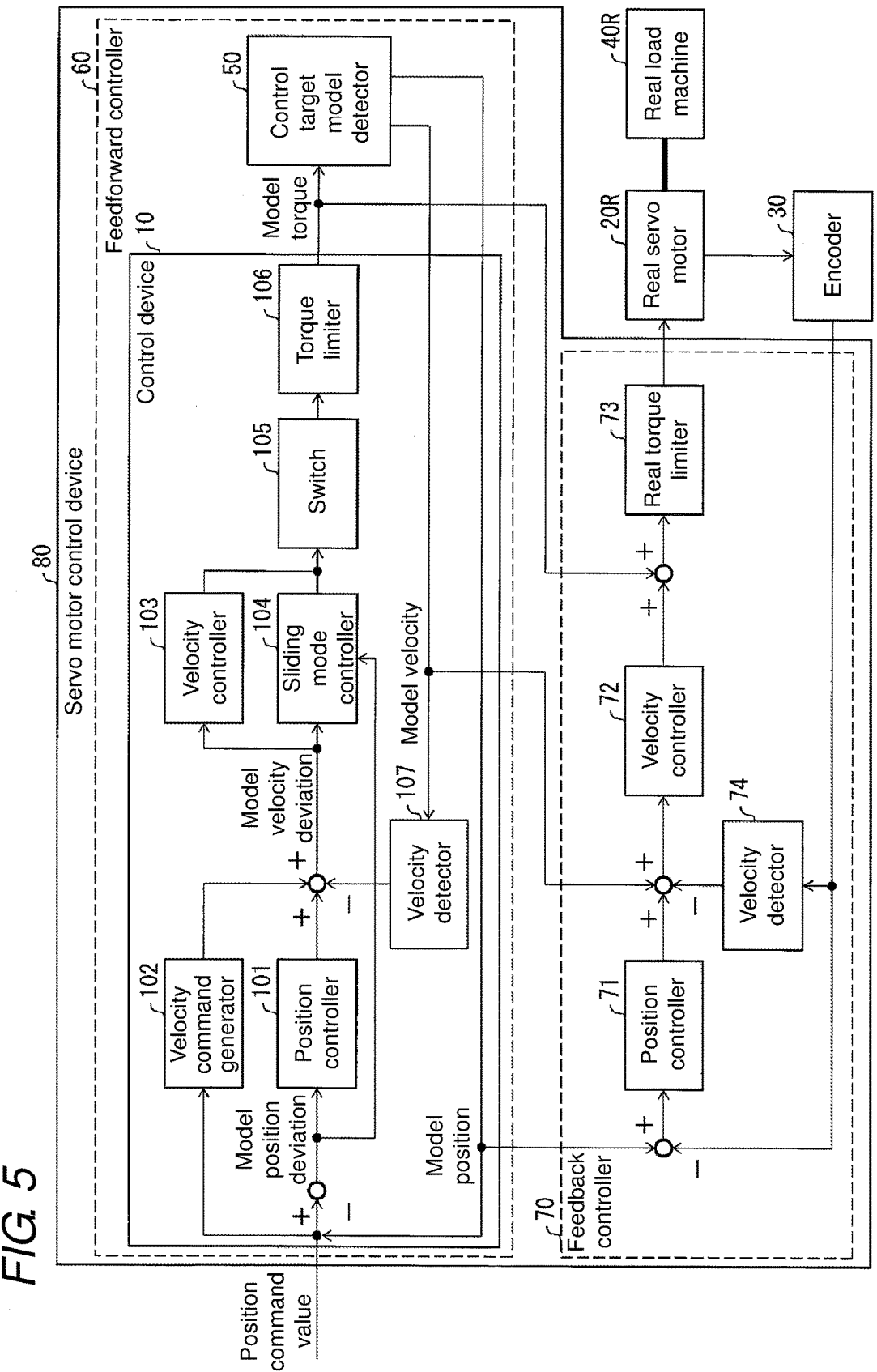
FIG. 5 is a block diagram illustrating a configuration of a main portion of a control device in a servo motor that implements model following control while including the control device in FIG. 1 as a feedforward controller.

FIG. 4 is a view illustrating the sliding mode control implemented by the sliding mode controller 104 of the control device 10. As illustrated in FIG. 4, with the velocity deviation $v_{err}$ and the position deviation $\theta_{err}$ as the input, the sliding mode controller 104 determines the torque of the servo motor 20 based on which one of the sides of the switching curve SL (switching plane) in FIG. 4 a point determined by the input velocity deviation $v_{err}$ and the position deviation $\theta_{err}$ is located on.

The switching curve SL is designed as the orbit that leads to an origin (that is, the position where both the position deviation $\theta_{err}$ and the velocity deviation $v_{err}$ become "0") when the servo motor 20 outputs the positive predetermined torque negative maximum torque τmin or the negative predetermined torque (for example, the positive maximum torque τmax that can be output from the servo motor 20, or the negative maximum torque, namely, the minimum torque τmin).

As illustrated in FIG. 4, the switching curve SL (switching plane) expressed by the velocity deviation $v_{err}$ and position deviation $\theta_{err}$ is drawn on a phase plane PP in which the horizontal axis indicates the velocity deviation $v_{err}$ while the vertical axis indicates the position deviation $\theta_{err}$. In the case that the point indicating the input is located on an upper-right side of the switching curve SL when a given input (the velocity deviation $v_{err}$ and position deviation $\theta_{err}$ received with the sliding mode controller 104) is plotted on the phase plane PP, the sliding mode controller 104 outputs positive predetermined torque that can be output from the servo motor 20 (for example, the maximum torque τmax that can be output from the servo motor 20). In the case that the point indicating the input is located on a lower-left side of the switching curve SL on the phase plane PP, the sliding mode controller 104 outputs the negative predetermined torque that can be output from the servo motor 20 (for example, the minimum torque that can be output from the servo motor 20, namely, the negative maximum torque τmin). In the case that the point indicating the input is located on the switching curve SL, the sliding mode controller 104 outputs the negative maximum torque in the second quadrant, and the sliding mode controller 104 outputs the positive maximum torque in the fourth quadrant. Therefore, both the position deviation and the velocity deviation converge toward the origin. Effect of control of control device of the embodiment As described above, the control device 10 can be used as not only a control device that controls a real servo motor 20R of an actual servo motor, but also a control device that controls a model servo motor 20M of a reference model in order to implement model following control on the real servo motor 20R. An example in which the control device 10 is used as the control device that controls the model servo motor 20M, namely, the feedforward control device will be described with reference to FIG. 5.

FIG. 5 is a block diagram illustrating a configuration of a main portion of a control device 80 in a servo motor that implements the model following control while including the control device 10 as a feedforward controller 60. As illustrated in FIG. 5, in the control device 10, the sliding mode controller 104 and the PID controller (that is, the position controller 101 and the velocity controller 103) control the model servo motor 20M that is the reference model of the real servo motor 20R. The control device 10 further includes a feedback controller 70 configured to implement the PID control on the position and the velocity of the real servo motor 20R such that the position and the velocity of the real servo motor 20R follow the position and the velocity of the model servo motor 20M controlled by the sliding mode controller 104 or the PID controller selected by the switch 105.

According to the above configuration, the control device 10 can implement the PID control on the servo motor 20 using the reference model in which the user easily understands the transmission characteristic while being able to cause the servo motor 20 to perform the desired operation without being conscious of the maximum torque τmax that can be output from the servo motor 20.

As illustrated in FIG. 5, in the case that the control device 10 is used as the feedforward controller 60 of the control device 80 that implements the model following control on the real servo motor 20R, the control device 10 controls the model servo motor 20M that is the model (reference model) of the real servo motor 20R. Specifically, the feedforward controller 60 including the control device 10 controls a model position, a model velocity, and a model torque of the model servo motor 20M, which are the position, velocity, and torque target value of the real servo motor 20R.

The velocity command generator 102 of the control device 10 receives the position command value $\theta_R$ provided from the outside (for example, from the user), and generates a model velocity command value from the position command value θR. The velocity command generator 102 outputs the generated model velocity command value to the velocity controller 103 and the sliding mode controller 104.

The velocity detector 107 obtains the velocity (model velocity) of the model servo motor 20M, which is detected with the control target model detector 50, from the control target model detector 50. The velocity detector 107 outputs the model velocity obtained from the control target model detector 50 to the velocity controller 103 and the sliding mode controller 104.

The position controller 101 and the velocity controller 103 implement the PID control on the model servo motor 20M. That is, the position controller 101 receives the position command value $\theta_R$ and the position (model position) of the model servo motor 20M detected by the control target model detector 50, and implements the control such that the model position follows the position command value $\theta_R$ (PID control). The position controller 101 may receive a model position deviation that is a deviation between the position command value $\theta_R$ and the model position, and generate the signal (velocity control signal) controlling the velocity of the servo motor 20 based on the model position deviation.

The velocity controller 103 receives the velocity control signal generated by the position controller 101 based on the model position deviation, the model velocity command value generated by the velocity command generator 102, and the model velocity from the velocity detector 107. The velocity controller 103 generates the signal controlling the model torque of the model servo motor 20M based on the velocity control signal, the model velocity command value, and the model velocity deviation that is the deviation with the model velocity. That is, the velocity controller 103 generates the signal controlling the model torque of the model servo motor 20M such that the model velocity follows the velocity control signal and the model velocity command value (PID control).

The sliding mode controller 104 receives the position command value $\theta_R$ and the model position detected with the control target model detector 50, particularly receives the model position deviation that is the deviation between the position command value $\theta_R$ and the model position. The sliding mode controller 104 receives the velocity control signal generated by the position controller 101 based on the model position deviation, the model velocity command value generated by the velocity command generator 102, and the model velocity from the velocity detector 107, particularly receives the velocity control signal, the model velocity command value, and the model velocity deviation that is the deviation with the model velocity. The sliding mode controller 104 generates the signal controlling the model torque of the model servo motor 20M such that the model position deviation and the model velocity deviation converge onto the switching curve SL (switching plane). At this point, the switching curve SL is determined by the predetermined torque that can be output from the real servo motor 20R (for example, the maximum torque τmax that can be output from the real servo motor 20R) and the motion characteristic of the real load machine 40R driven by the real servo motor 20R. The switching curve SL will be described in detail later with reference to FIG. 4.

The switch 105 selects the control by the sliding mode controller 104 or the control by the PID controller (that is, the position controller 101 and the velocity controller 103) for the model servo motor 20M based on at least one of the model position deviation and the model velocity deviation. The switching technique of the switch 105 will be described in detail later with reference to FIGS. 8 to 22B.

The torque limiter 106 controls the torque of the model servo motor 20M based on the signal (the signal controlling the torque of the model servo motor 20M) generated by the PID controller (that is, the position controller 101 and the velocity controller 103) or the sliding mode controller 104.

The control target model detector 50 calculates the model position and model velocity of the model servo motor 20M based on the model torque output from the torque limiter 106. The control target model detector 50 notifies the position controller 101, the velocity command generator 102, the velocity controller 103, the velocity detector 107, and the feedback controller 70 of the calculated model position and model velocity.

The feedback controller 70 implements the PID control on the real servo motor 20R such that the real servo motor 20R follows the model servo motor 20M controlled by the feedforward controller 60 (control device 10). That is, the feedback controller 70 implements the PID control on the position, velocity, and torque of the real servo motor 20R such that the position, velocity, and torque of the real servo motor 20R follow the model position, model velocity, and model torque of the model servo motor 20M controlled by the feedforward controller 60 including the control device 10. The feedback controller 70 includes a position controller 71, a velocity controller 72, a real torque limiter 73, and a velocity detector 74.

The position controller 71 receives the position of the real servo motor 20R detected with the encoder 30 and the model position of the model servo motor 20M generated by the control target model detector 50. The position controller 71 generates a velocity control command such that the position of the real servo motor 20R follows the model position, and outputs the generated velocity control command to the velocity controller 72.

The velocity detector 74 calculates the velocity of the real servo motor 20R from the position of the real servo motor 20R detected with the encoder 30, and outputs the calculated velocity of the real servo motor 20R to the velocity controller 72.

The velocity controller 72 receives the velocity control command generated by the position controller 71, the velocity of the model servo motor 20M generated by the control target model detector 50, and the velocity (the velocity of the real servo motor 20R) calculated with the velocity detector 74. The velocity controller 72 generates a torque control command such that the velocity of the real servo motor 20R calculated with the velocity detector 74 follows the velocity control command and the model velocity, and outputs the generated torque control command to the real torque limiter 73.

The real torque limiter 73 controls the real servo motor 20R based on the torque control command generated by velocity controller 72 and the model torque of the model servo motor 20M generated by the control target model detector 50.

Velocity Command Received with Sliding Mode Controller

The velocity deviation $v_{err}$ received with the sliding mode controller 104 of the control device 10 is the deviation between the velocity command value $v_R$ generated by the velocity command generator 102 based on the position command value $\theta_R$ provided from the outside (for example, from the user) and the feedback velocity $v_{fb}$ calculated with the velocity detector 107 from the position (feedback position $\theta_{fb}$) of the servo motor 20 detected with the encoder 30.

How to change a behavior of the model controlled by the sliding mode controller 104 by the velocity command value $v_R$ received with the sliding mode controller 104, namely, the velocity command value $v_R$ generated by the velocity command generator 102 will be described below with reference to FIGS. 6 and 7. The case that the velocity command value $v_R$ received with the sliding mode controller 104 is set to "differentiation of the position command value $\theta_R$" and the case that the velocity command value $v_R$ is set to "0" will specifically be described. In the control device 10, the velocity command value $v_R$ received with the sliding mode controller 104 can be set to "the differentiation of the position command". That is, the velocity command generator 102 may output the velocity command value $v_R$ that is "the differentiation of the position command" to the sliding mode controller 104.

Figure 6:
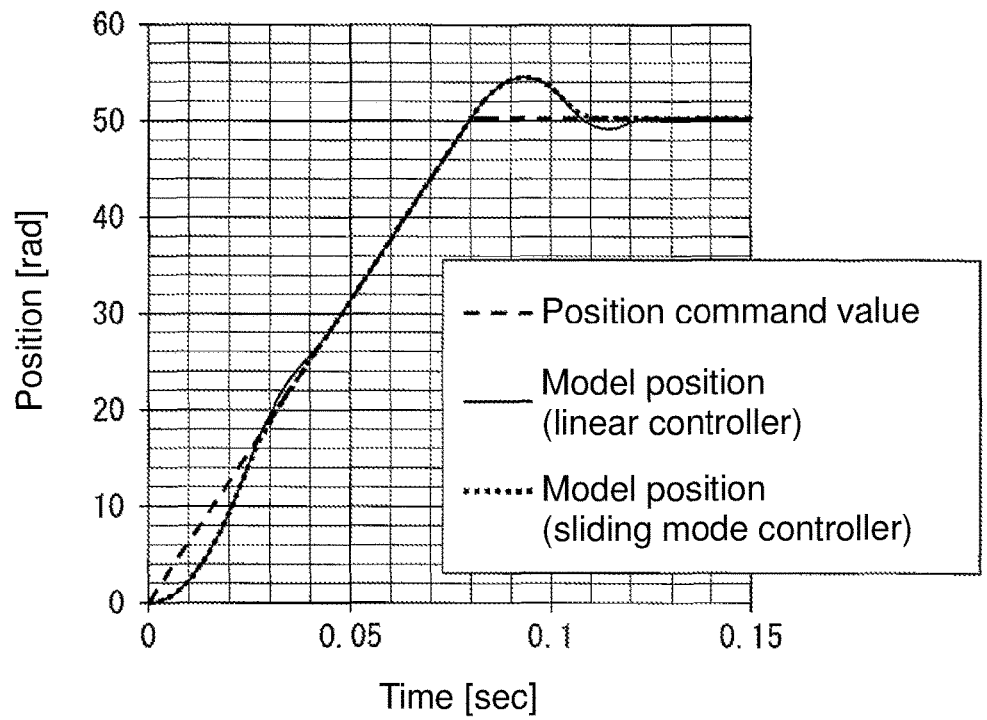
FIG. 6 is a view illustrating a locus of a model output position when a velocity command is set to differentiation of a position command with respect to the sliding mode control implemented by the control device in FIG. 1.

FIG. 6 is a view illustrating the locus of the model output position when the velocity command value is set to the differentiation of the position command with respect to the sliding mode control by the control device 10, namely, FIG. 6 is a view illustrating the behavior of the model controlled by the sliding mode controller 104 when the velocity command value $v_R$ received with the sliding mode controller 104 is set to "the differentiation of the position command value $\theta_R$". As illustrated in FIG. 6, when the velocity command value $v_R$ received with the sliding mode controller 104 is set to "the differentiation of the position command value $\theta_R$", high command followability is obtained for the position command value $\theta_R$ while the model output position can overshoot.

In the control device 10, the velocity command value $v_R$ received with the sliding mode controller 104 can be set to "0". That is, the velocity command generator 102 may output the velocity command value $v_R$ that is "0" to the sliding mode controller 104.

According to the above configuration, in the control device 10, because the velocity command value $v_R$ is zero, the velocity of the servo motor 20 also becomes zero at the point of time the position of the servo motor 20 arrives at the target position indicated by the position command value $\theta_R$, and the position of the servo motor 20 does not overshoot.

Figure 7:
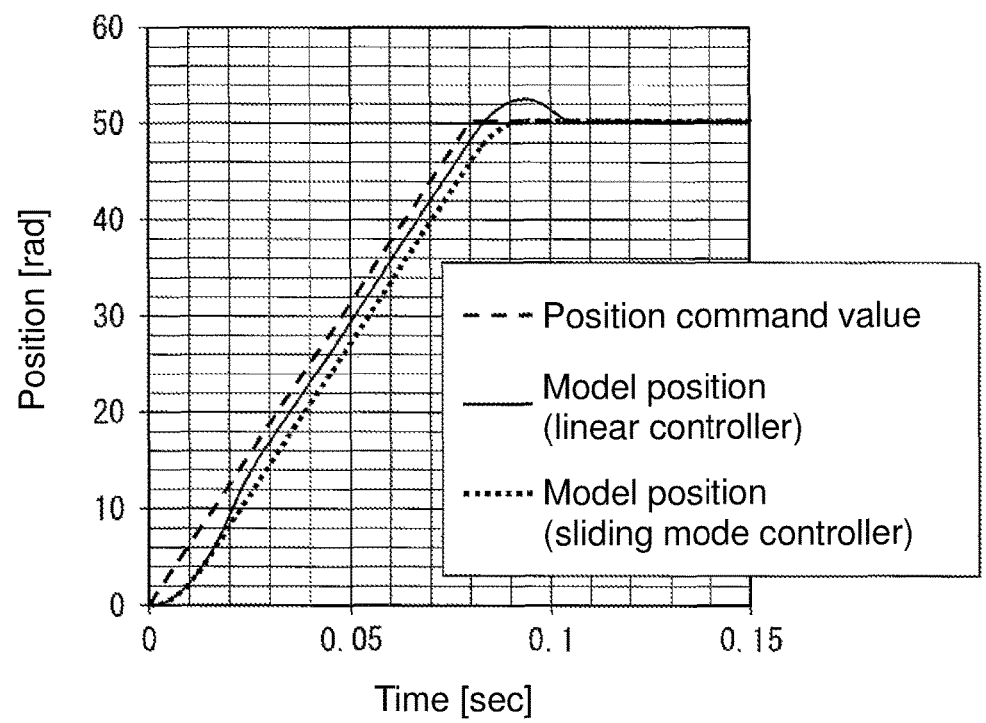
FIG. 7 is a view illustrating the locus of the model output position when the velocity command is set to "0" with respect to the sliding mode control implemented by the control device in FIG. 1.

FIG. 7 is a view illustrating the locus of the model output position when the velocity command value is set to "0" with respect to the sliding mode control implemented by the control device 10, namely, FIG. 7 is a view illustrating the behavior of the model controlled by the sliding mode controller 104 when the velocity command value $v_R$ received with the sliding mode controller 104 is set to "0". As illustrated in FIG. 7, when the velocity command value $v_R$ received with the sliding mode controller 104 is set to "0", high command followability is obtained for the position command value $\theta_R$ while the model output position does not overshoot while a delay is generated with respect to the position command value $\theta_R$ to degrade the command followability.

Method for Switching Between PID Control and Sliding Mode Control

The control device 10 switches between the PID control and the sliding mode control according to the state (the position deviation $\theta_{err}$ and the velocity deviation $v_{err}$), thereby obtaining the following effect. That is, the control device 10 has an advantage that "the user easily understands the characteristic" in the PID control and an advantage that "the orbit in which the problem such as the overshoot and the hunting does not occur can be generated even if the torque is limited" in the sliding mode control.

At this point, the switch 105 of the control device 10 switches between the PID control (the torque of the servo motor 20 controlled by the position controller 101 and velocity controller 103) and the sliding mode control (the torque of the servo motor 20 controlled by the sliding mode controller 104) by the following three kinds of methods (proposed techniques 1 to 3). In each of the proposed techniques 1 to 3, the occurrence of the overshoot and the hunting can be prevented even if the manipulated variable is saturated, namely, even if the output torque (the model torque of the servo motor 20 controlled by the control device 10) of the control device 10 is saturated.

Proposed Technique 1

Figure 8:
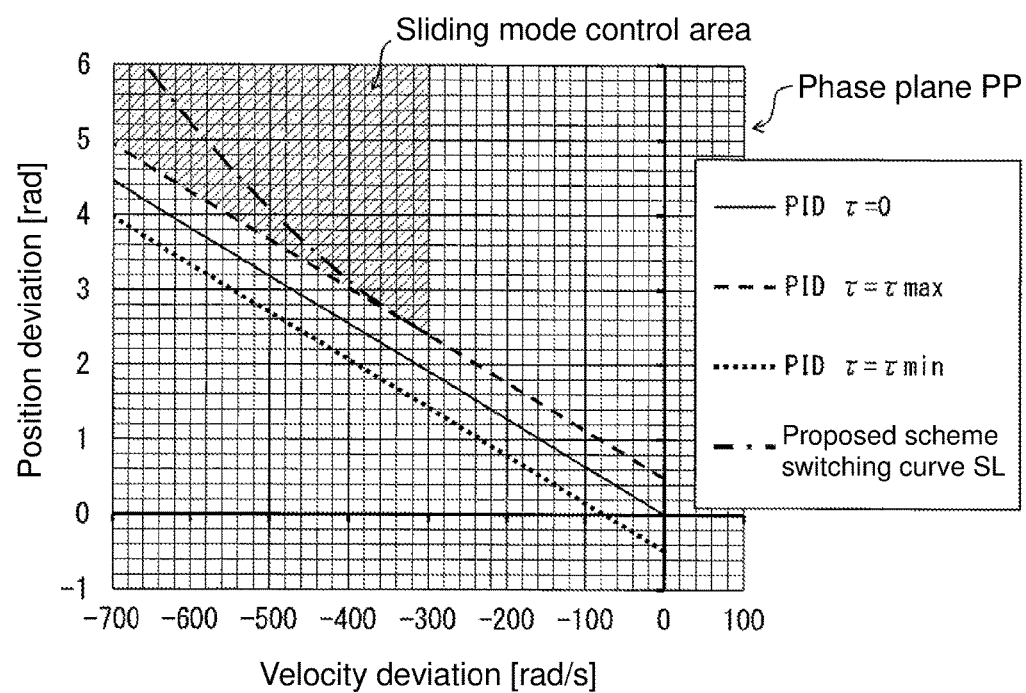
FIG. 8 is a view illustrating a switching curve of a proposed technique 1 with respect to the control device in FIG. 1.

FIG. 8 is a view illustrating the switching curve SL of the proposed technique 1 with respect to the control device 10. In the proposed technique 1 of FIG. 8, the switch 105 switches between the PID control and the sliding mode control based on a policy that "the PID control is maintained unless the manipulated variable is saturated".

The switch 105 that adopts the proposed technique 1 selects the control of the servo motor 20 with the PID controller when the torque controlled by the PID controller (that is, the position controller 101 and the velocity controller 103) is equal to or less than the maximum torque τmax (or the negative maximum torque, namely, the minimum torque τmin) (first predetermined value) that can be output from the servo motor 20, and the switch 105 selects the control of the servo motor 20 with the sliding mode controller 104 when the torque controlled by the PID controller is more than the maximum torque τmax that can be output from the servo motor 20.

According to the above configuration, in the control device 10, when the torque controlled by the PID controller is equal to or less than the maximum torque τmax, the PID controller can control the torque of the servo motor 20, and the sliding mode control can prevent the overshoot and the hunting from occurring in the servo motor 20.

The switch 105 that adopts the proposed technique 1 translates the switching curve SL such that the switching curve SL is in contact with the straight line drawn on the phase plane PP (the phase plane PP in FIG. 8), in which the vertical axis indicates the position deviation $\theta_{err}$ while the horizontal axis indicates the velocity deviation $v_{err}$, when the torque controlled by the PID controller (that is, the position controller 101 and the velocity controller 103) is the maximum torque τmax, and the switch 105 causes the sliding mode controller 104 to implement the sliding mode control such that the position deviation $\theta_{err}$ and the velocity deviation $v_{err}$ converge onto the translated switching curve SL.

According to the above configuration, when the torque controlled by the PID controller is equal to or less than the maximum torque τmax, and the control device 10 can cause the PID controller to control the torque of the servo motor 20, and cause the sliding mode controller 104 to implement the sliding mode control such that the position deviation $\theta_{err}$ and the velocity deviation $v_{err}$ converge onto the translated switching curve SL.

On the phase plane PP in FIG. 8 (the phase plane PP in which the vertical axis indicates the position deviation $\theta_{err}$ while the horizontal axis indicates the velocity deviation $v_{err}$), the proposed-scheme switching curve SL is one in which the switching curve SL (switching plane) in the original sliding mode is translated in a direction of the position deviation $\theta_{err}$ to come into contact with a line of the maximum torque τmax in the area where the PID control is implemented. As used herein, the switching curve SL in the original sliding mode means one that is designed as the orbit leading to the origin (that is, the position where both the position deviation $\theta_{err}$ and the velocity deviation $v_{err}$ become "0") when the servo motor 20 outputs the positive predetermined torque negative maximum torque τmin or the negative predetermined torque (for example, the positive maximum torque τmax that can be output from the servo motor 20, or the negative maximum torque, namely, the minimum torque τmin).

Referring to FIG. 8, the switching curve SL (proposed-scheme switching curve SL) in which the switching curve SL (switching plane) in the original sliding mode is translated in the direction of the position deviation $\theta_{err}$ and the line (that is, a dotted line (PID,τmax)) of the maximum torque τmax in the area where the PID control is implemented are in contact with each other in "velocity deviation $v_{err}=-300$". In FIG. 8, the case that the torque controlled by the PID controller (that is, the position controller 101 and the velocity controller 103) is more than the maximum torque that can be output from the servo motor 20 means the case that the velocity deviation $v_{err}$ is less than "velocity deviation $v_{err}=-300$" while the position deviation $\theta_{err}$ is more than the dotted line (PID,τmax). That is, in FIG. 8, the switch 105 selects the control of the servo motor 20 with the sliding mode controller 104 in the hatched area as the sliding mode control area.

Figure 9A:
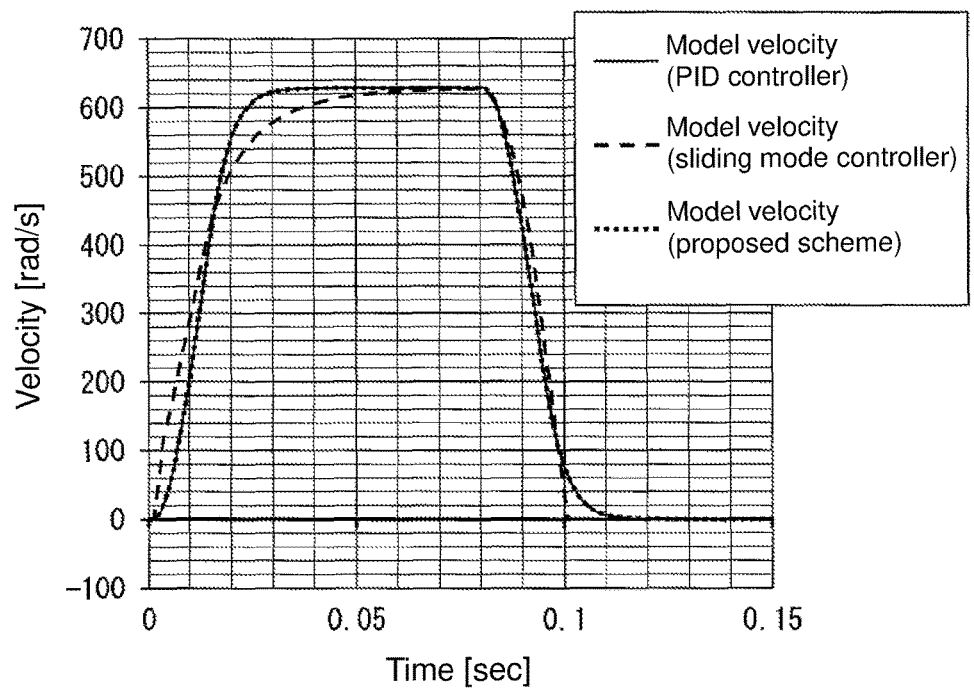
FIGS. 9A and 9B are views illustrating loci of the controlled velocity and torque during the unsaturation of the manipulated variable, and are graphs illustrating comparison of the case of only PID control, the case of only sliding mode control, and the case that the control device in FIG. 1 implements the control using the switching curve of the proposed technique 1.
Figure 9B:
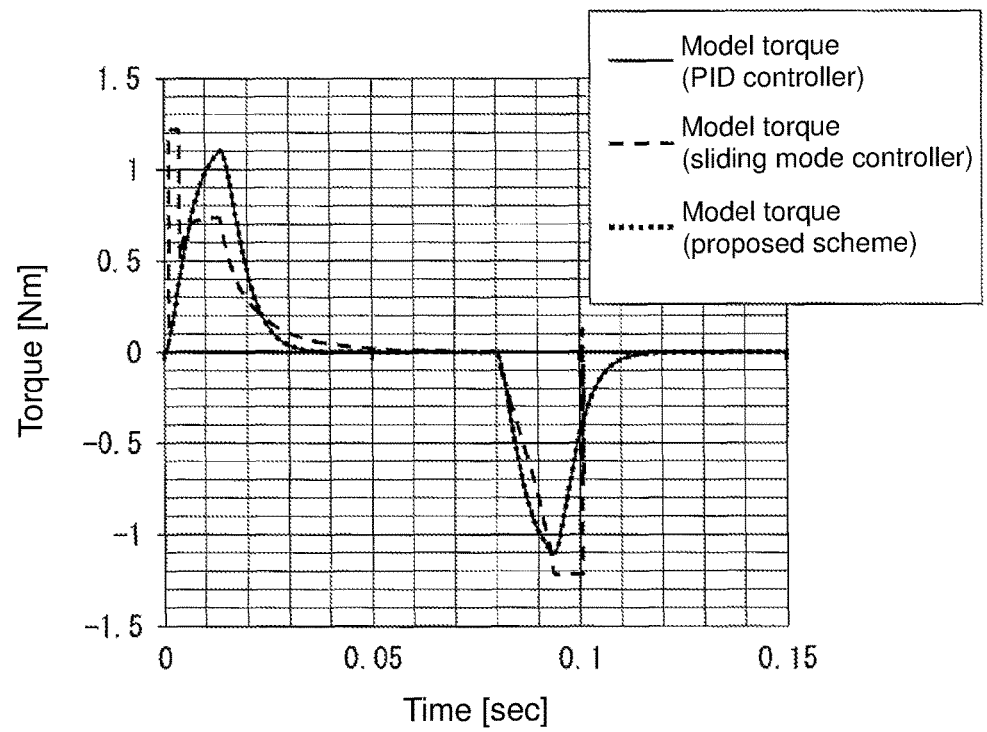

FIGS. 9A and 9B are views illustrating loci of the controlled velocity and torque during the unsaturation of the manipulated variable, and are graphs illustrating comparison of the case of only PID control, the case of only sliding mode control, and the case that the control device 10 implements the control using the switching curve SL of the proposed technique 1. As illustrated in FIGS. 9A and 9B, in the case that the manipulated variable is not saturated, the loci of the velocity and torque controlled by the control device 10 that adopts the proposed technique 1 is completely matched with the loci of the velocity and torque controlled only by the PID control.

Figure 10A:
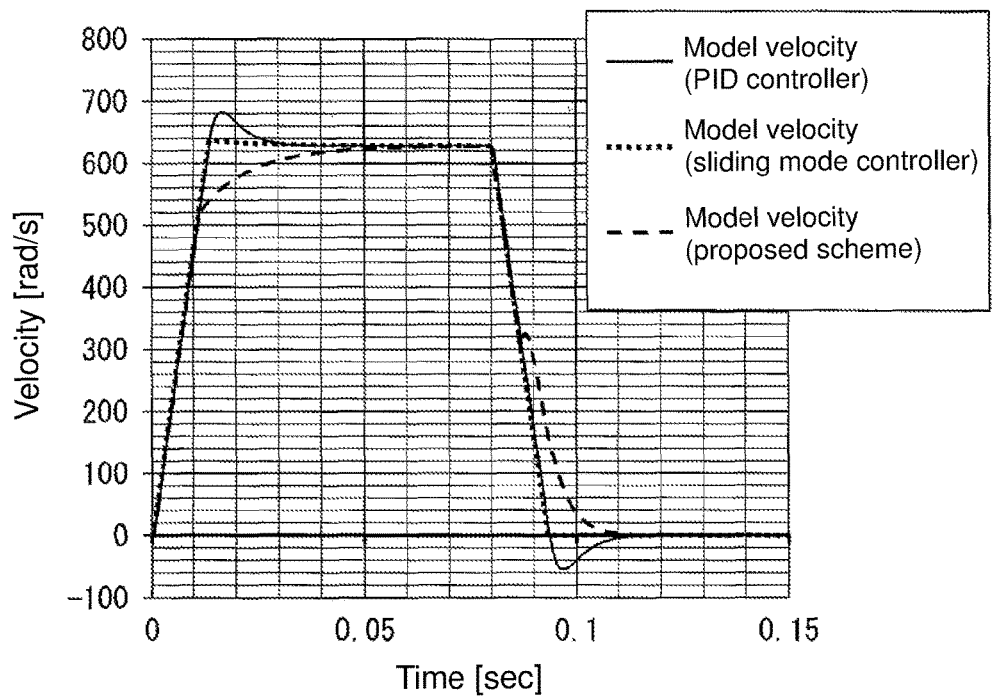
FIGS. 10A and 10B are views illustrating the loci of the controlled velocity and torque during the saturation of the manipulated variable, and are graphs illustrating comparison of the case of only PID control, the case of only sliding mode control, and the case that the control device in FIG. 1 implements the control using the switching curve of the proposed technique 1.
Figure 10B:
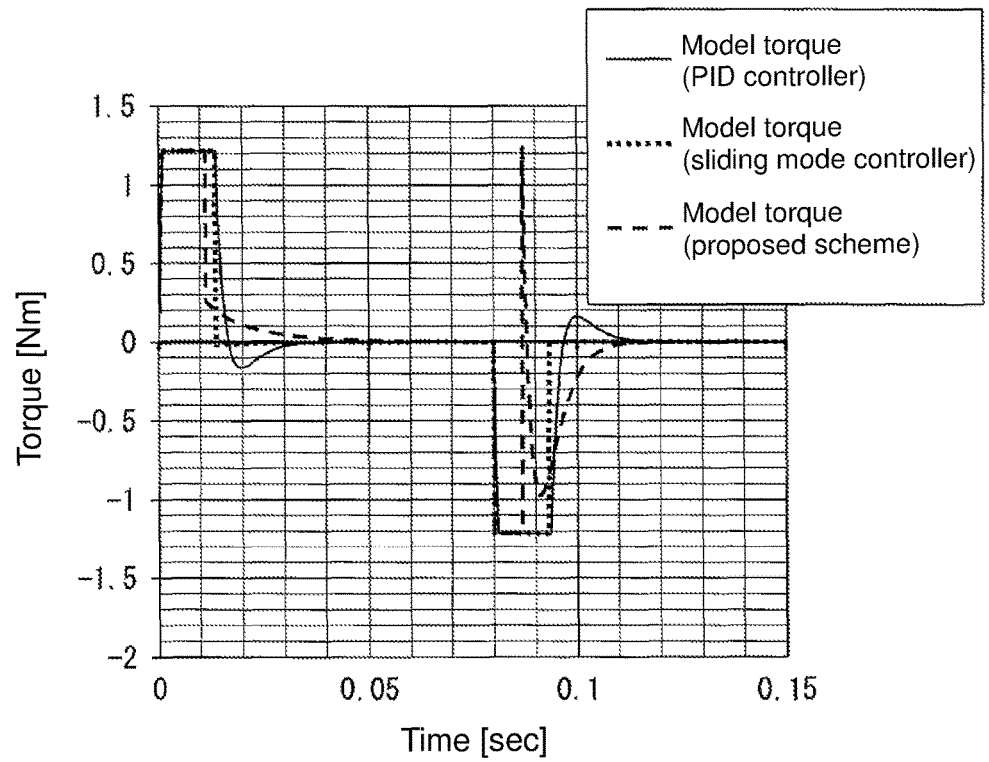

FIGS. 10A and 10B are views illustrating loci of the controlled velocity and torque during the saturation of the manipulated variable, and are graphs illustrating comparison of the case of only PID control, the case of only sliding mode control, and the case that the control device 10 implements the control using the switching curve SL of the proposed technique 1.

Figure 11A:
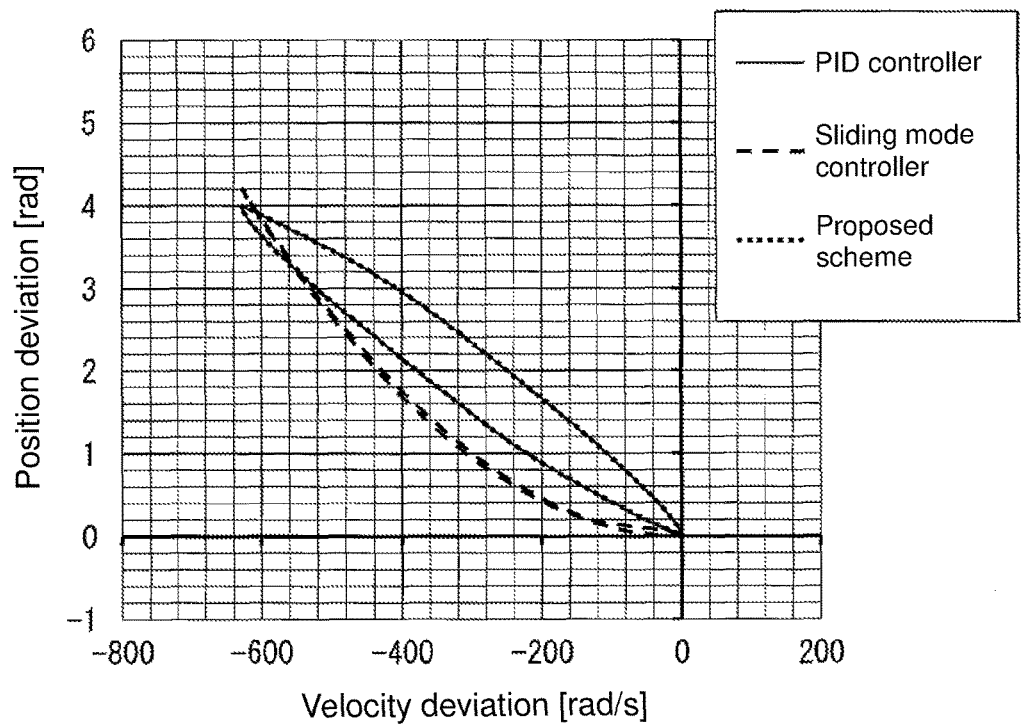
FIGS. 11A and 11B are graphs on a phase plane, in which a horizontal axis indicates a velocity deviation while a vertical axis indicates a position deviation, illustrating the comparison of the case of only the PID control, the case of only the sliding mode control, and the case that the control device in FIG. 1 implements the control using the switching curve of the proposed technique 1.
Figure 11B:
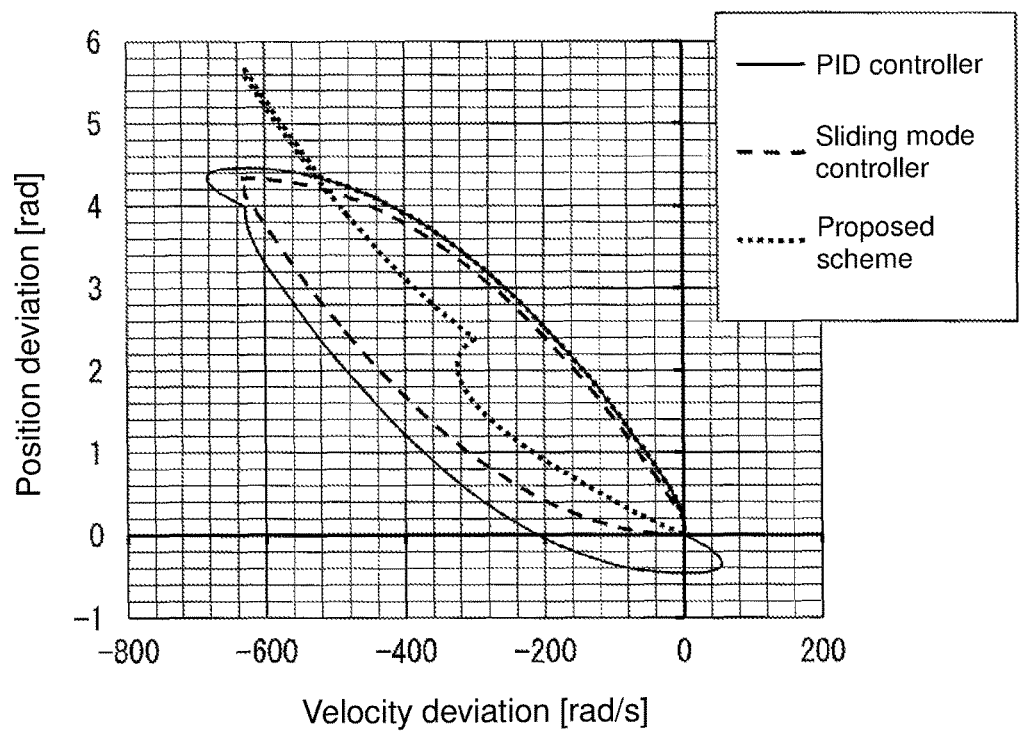

FIGS. 11A and 11B are graphs on the phase plane PP, in which a horizontal axis indicates the velocity deviation $v_{err}$ while a vertical axis indicates the position deviation $\theta_{err}$, illustrating the comparison of the case of only the PID control, the case of only the sliding mode control, and the case that the control device 10 implements the control using the switching curve SL of the proposed technique 1. As illustrated in FIGS. 11A and 11B, in the case that the manipulated variable is not saturated, the loci of the position deviation $\theta_{err}$ and velocity deviation $v_{err}$ controlled by the control device 10 that adopts the proposed technique 1 is completely matched with the loci of the position deviation $\theta_{err}$ and velocity deviation $v_{err}$ controlled only by the PID control.

As illustrated in FIGS. 9A to 11B, when the proposed technique 1 is adopted, the control implemented by the control device 10 indicates the characteristic equivalent to the case that the torque of the servo motor 20 is controlled only by the PID control unless the manipulated variable is saturated, namely, unless the torque of the servo motor 20 controlled only with the control device 10 is saturated. However, in the control device 10 that adopts the proposed technique 1, the manipulated variable is discontinuous because discontinuity is generated at a point in which the area where the sliding mode control is implemented transfers to the area where the PID control is implemented. In the control device 10 that adopts the proposed technique 1, the orbit for the saturated manipulated variable is slower than the later-described proposed technique 2 and proposed technique 3.

Proposed Technique 2

Figure 12:
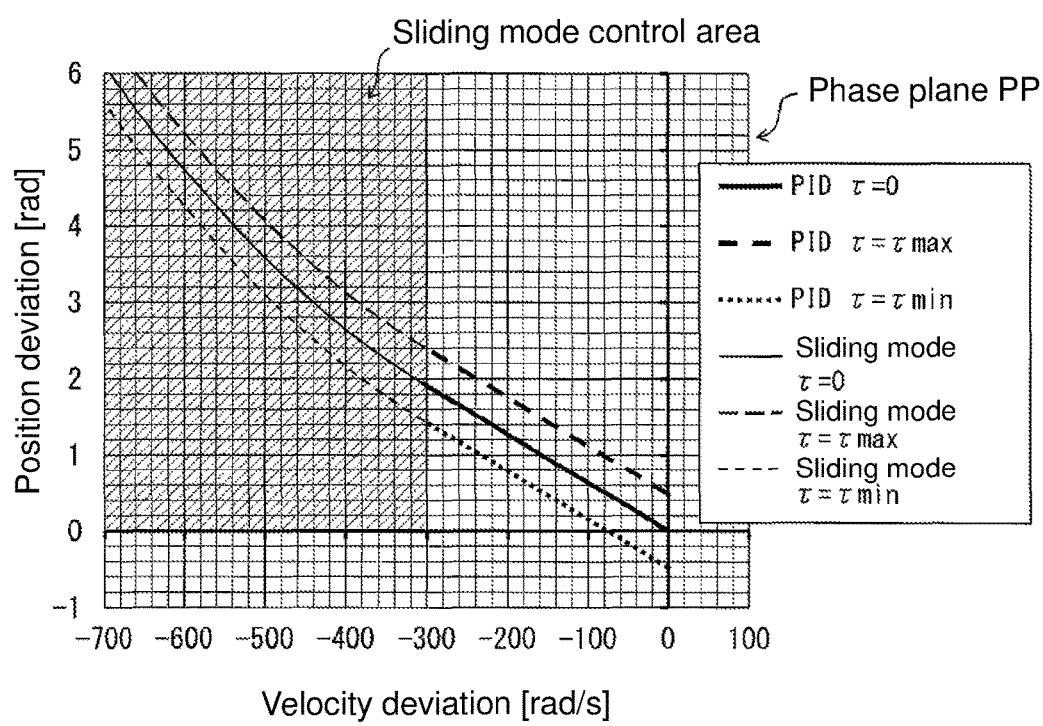
FIG. 12 is a view illustrating a switching curve of a proposed technique 2 with respect to the control device in FIG. 1.

FIG. 12 is a view illustrating the switching curve SL of the proposed technique 2 with respect to the control device 10. In the proposed technique 2 of FIG. 12, the switch 105 switches between the PID control and the sliding mode control based on a policy that "the PID area and the sliding mode area are smoothly switched".

The switch 105 that adopts the proposed technique 2 selects the PID controller (that is, the position controller 101 and the velocity controller 103) when the velocity deviation $v_{err}$ controlled by the PID controller is equal to or less than the second predetermined value, when the velocity deviation $v_{err}$ controlled by the PID controller is more than the second predetermined value, the switch 105 translates the switching curve SL such that the switching curve SL is in contact with a straight line drawn on the phase plane PP, in which the vertical axis indicates the position deviation $\theta_{err}$ while the horizontal axis indicates the velocity deviation $v_{err}$, when the torque controlled by the PID controller is zero at a place where the velocity deviation $v_{err}$ is the second predetermined value, and the switch 105 causes the sliding mode controller 104 to implement the sliding mode control such that the position deviation $\theta_{err}$ and the velocity deviation $v_{err}$ converge onto the translated switching curve SL.

According to the above configuration, because the control device 10 can smoothly change the torque of the servo motor 20 from the control by the sliding mode controller 104 to the control by the PID controller, the torque of the servo motor 20 can smoothly be changed, and the sliding mode control can prevent the overshoot and the hunting from occurring in the servo motor 20 or the reference model.

In the control device 10 that adopts the proposed technique 2, the buffer area is an area sandwiched between the minimally-translated translation switching curve SL and the maximally-translated switching curve SL, the minimally-translated translation switching curve SL and the maximally-translated switching curve SL being obtained by translating the switching curve SL such that the switching curve SL is in contact with the minimum torque straight line and the maximum torque straight line at the place where the velocity deviation $v_{err}$ is the second predetermined value, respectively, the minimum torque straight line being a straight line drawn on the phase plane when the torque controlled by the PID controller (that is, the position controller 101 and the velocity controller 103) is a minimum torque output from the servo motor 20, the maximum torque straight line being a straight line drawn on the phase plane PP when the torque controlled by the PID controller is a maximum torque output from the servo motor 20.

According to the above configuration, in the control device 10, the area sandwiched between the minimally-translated translation switching curve SL and the maximally-translated switching curve SL can be set to the buffer area.

On the phase plane PP in FIG. 12 (the phase plane PP in which the vertical axis indicates the position deviation $\theta_{err}$ while the horizontal axis indicates the velocity deviation $v_{err}$), a curve (the switching curve SL of the proposed technique 2) of (sliding mode,τ=0) is the switching curve SL in which the switching curve SL (switching plane) in the original sliding mode is translated in the direction of the position deviation $\theta_{err}$ to come into contact with the line (that is, the straight line of (PID,τ=0)) of τ=0 in the area where the PID control is implemented. As used herein, the switching curve SL in the original sliding mode means one that is designed as the orbit leading to the origin (that is, the position where both the position deviation $\theta_{err}$ and the velocity deviation $v_{err}$ become "0") when the servo motor 20 outputs the positive predetermined torque negative maximum torque τmin or the negative predetermined torque (for example, the positive maximum torque τmax that can be output from the servo motor 20, or the negative maximum torque, namely, the minimum torque τmin).

In FIG. 12, the translated switching curve SL (that is, the curve of (sliding mode,τ=0)) is in contact with the line (that is, the straight line of (PID,τ=0)) of τ=0 in the area where the PID control is implemented at the point of "velocity deviation $v_{err}$=−300 (second predetermined value)". Accordingly, the switch 105 that adopts the proposed technique 2 in FIG. 12 selects the PID controller when the velocity deviation $v_{err}$ controlled by the PID controller is equal to or less than the second predetermined value (−300), and when the velocity deviation $v_{err}$ controlled by the PID controller is more than the second predetermined value (−300), the switch 105 causes the sliding mode controller 104 to implement the sliding mode control such that the position deviation $\theta_{err}$ and the velocity deviation $v_{err}$ converge onto the translated switching curve SL (that is, the curve of (sliding mode, τ=0)).

On the phase plane PP in FIG. 12, a curve (the maximally-translated switching curve SL) of sliding mode,τ=τmax) is the switching curve SL in which the switching curve SL in the original sliding mode is translated in the direction of the position deviation $\theta_{err}$ to come into contact with the line (that is, the straight line of (PID,τ=τmax)) of τ=max in the area where the PID control is implemented. The curve (sliding mode,τ=τmax) and the line (that is, the straight line of (PID,τ=τmax)) of τ=max in the area where the PID control is implemented are in contact with each other at the point of "velocity deviation $v_{err}$=−300 (second predetermined value)".

On the phase plane PP in FIG. 12, a curve (the minimally-translated switching curve SL) of (sliding mode,τ=τmin) is the switching curve SL in which the switching curve SL in the original sliding mode is translated in the direction of the position deviation $\theta_{err}$ to come into contact with the line (that is, the straight line of (PID,τ=τmin)) of τ=min in the area where the PID control is implemented. The curve (sliding mode,τ=τmin) and the line (that is, the straight line of (PID,τ=τmin)) of τ=min in the area where the PID control is implemented are in contact with each other at the point of "velocity deviation $v_{err}$=−300 (second predetermined value)".

On the phase plane PP in FIG. 12, the control device 10 that adopts the proposed technique 2 uses the area sandwiched between the curve of (sliding mode,τ=τmax) and the curve of (sliding mode,τ=τmin) as the buffer area. In the buffer area, the torque output from the sliding mode controller 104 changes smoothly (decreases gradually) from the curve of τmax toward the curve of τmin.

Figure 13A:
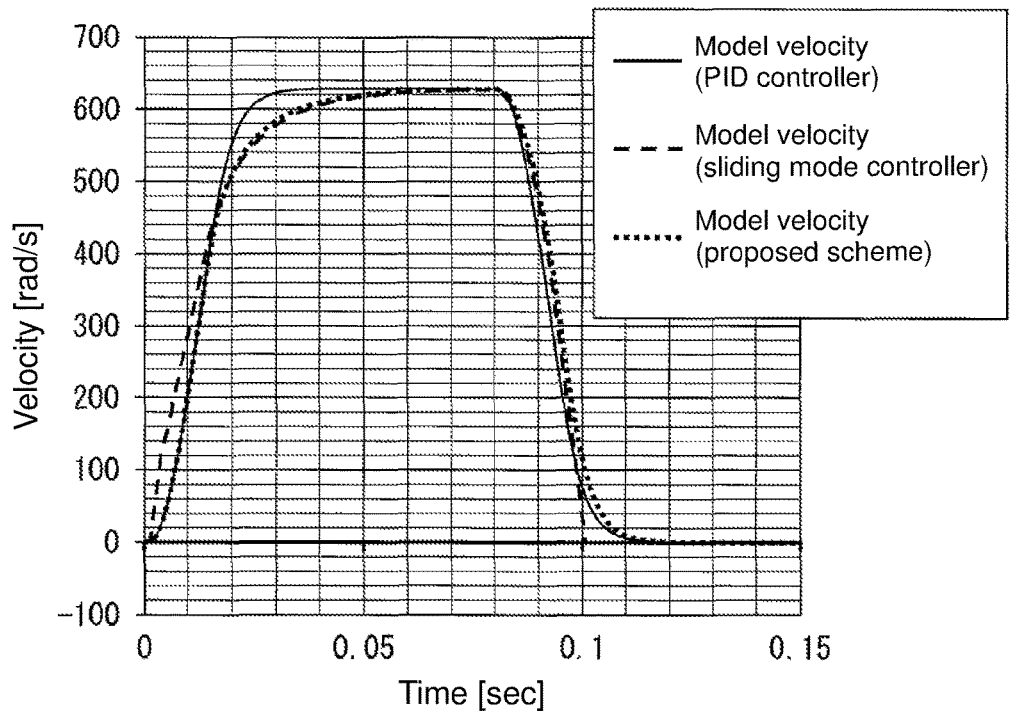
FIGS. 13A and 13B are views illustrating the loci of the controlled velocity and torque during the unsaturation of the manipulated variable, and are graphs illustrating comparison of the case of only PID control, the case of only sliding mode control, and the case that the control device in FIG. 1 implements the control using the switching curve of the proposed technique 2.
Figure 13B:
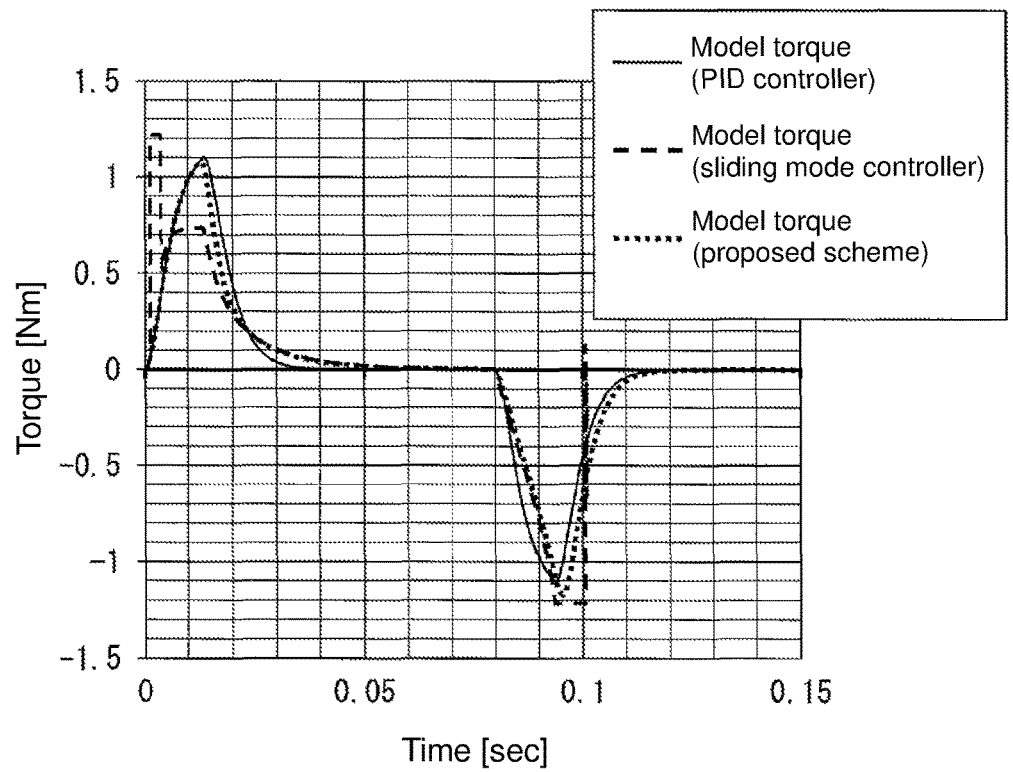

FIGS. 13A and 13B are views illustrating loci of the controlled velocity and torque during the unsaturation of the manipulated variable, and are graphs illustrating comparison of the case of only PID control, the case of only sliding mode control, and the case that the control device 10 implements the control using the switching curve SL of the proposed technique 2.

Figure 14A:
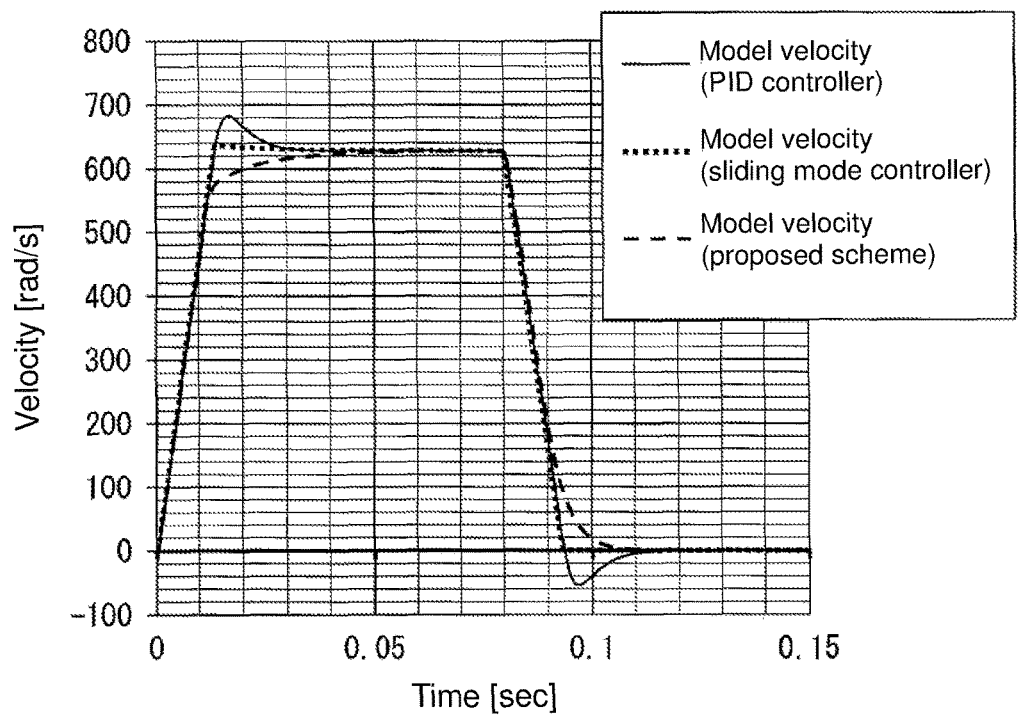
FIGS. 14A and 14B are views illustrating the loci of the controlled velocity and torque during the saturation of the manipulated variable, and are graphs illustrating comparison of the case of only PID control, the case of only sliding mode control, and the case that the control device in FIG. 1 implements the control using the switching curve of the proposed technique 2.
Figure 14B:
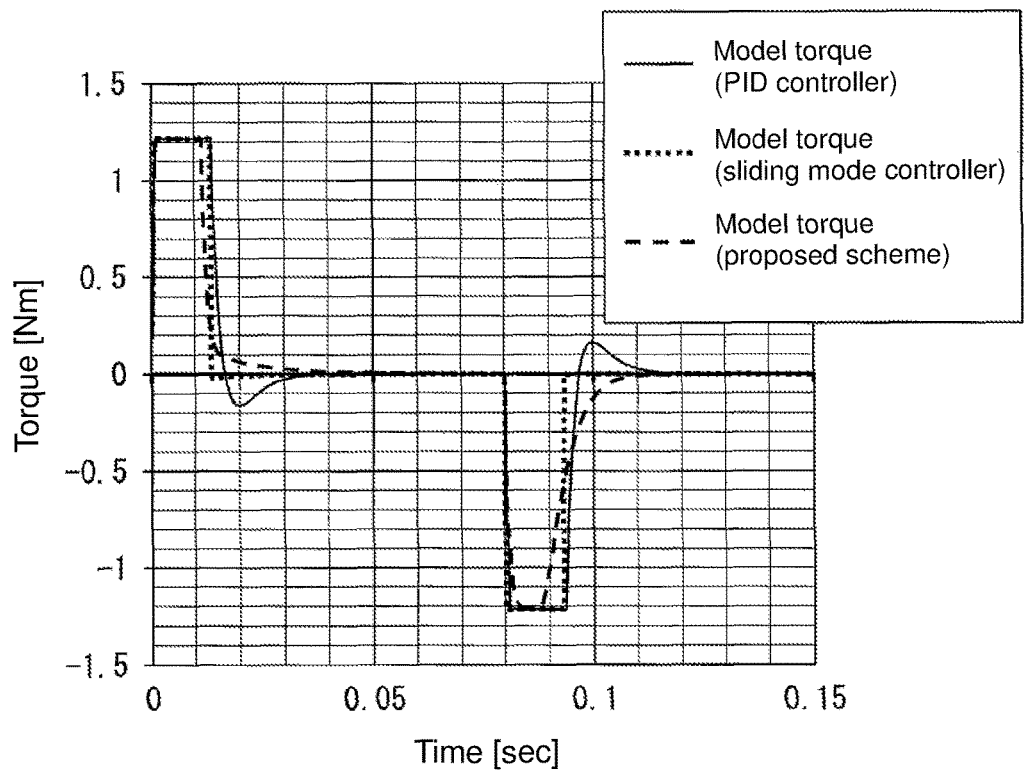

FIGS. 14A and 14B are views illustrating loci of the controlled velocity and torque during the saturation of the manipulated variable, and are graphs illustrating comparison of the case of only PID control, the case of only sliding mode control, and the case that the control device 10 implements the control using the switching curve SL of the proposed technique 2.

Figure 15A:
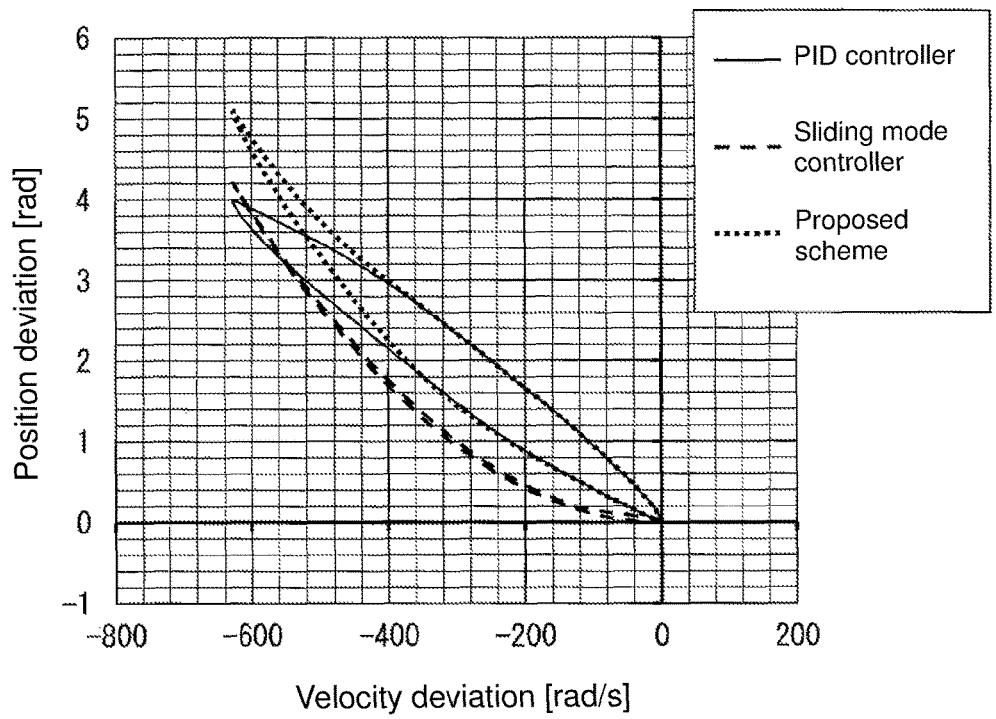
FIGS. 15A and 15B are graphs on the phase plane, in which the horizontal axis indicates the velocity deviation while the vertical axis indicates the position deviation, illustrating the comparison of the case of only the PID control, the case of only the sliding mode control, and the case that the control device in FIG. 1 implements the control using the switching curve of the proposed technique 2.
Figure 15B:
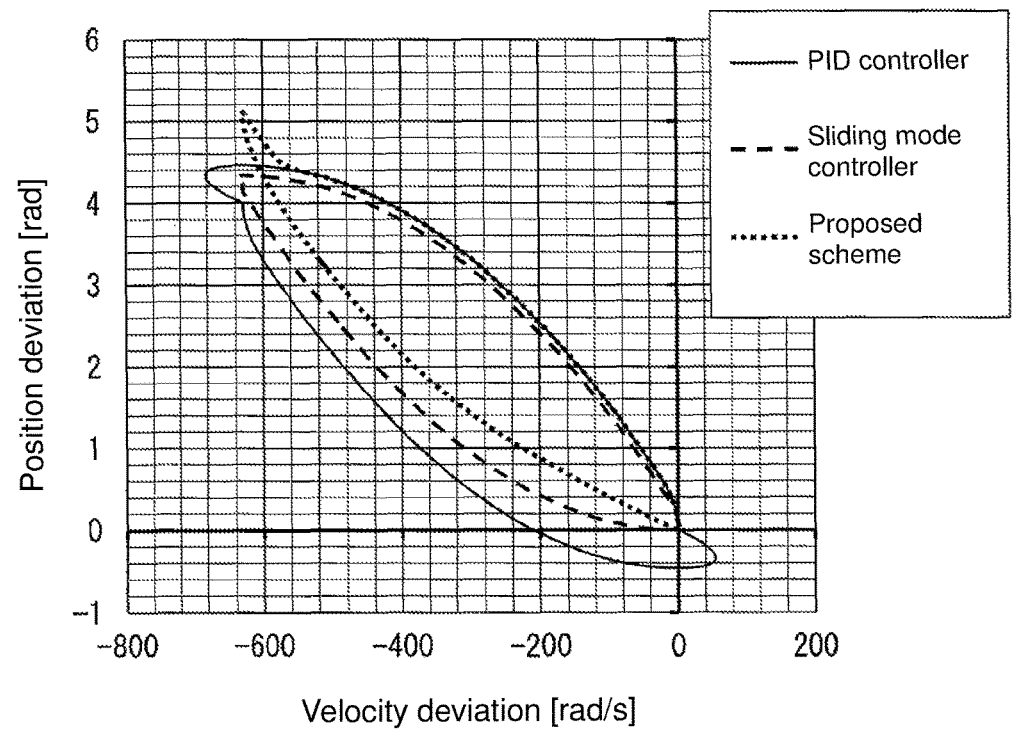

FIGS. 15A and 15B are graphs on the phase plane PP, in which a horizontal axis indicates the velocity deviation $v_{err}$ while a vertical axis indicates the position deviation $\theta_{err}$, illustrating the comparison of the case of only the PID control, the case of only the sliding mode control, and the case that the control device 10 implements the control using the switching curve SL of the proposed technique 2.

As illustrated in FIGS. 13A to 15B, when the proposed technique 2 is adopted, in the control implemented by the control device 10, the area (the area where the switch 105 selects the control by the PID controller (that is, the position controller 101 and the velocity controller 103)) where the PID control is implemented and the area (the area where the switch 105 selects the control by the sliding mode controller 104) where the sliding mode control is implemented are continuous, the manipulated variable is also continuous, and the smooth orbit is obtained. However, the area where the PID control is implemented is limited in the control implemented by the control device 10 that adopts the proposed technique 2.

Proposed Technique 3

Figure 16:
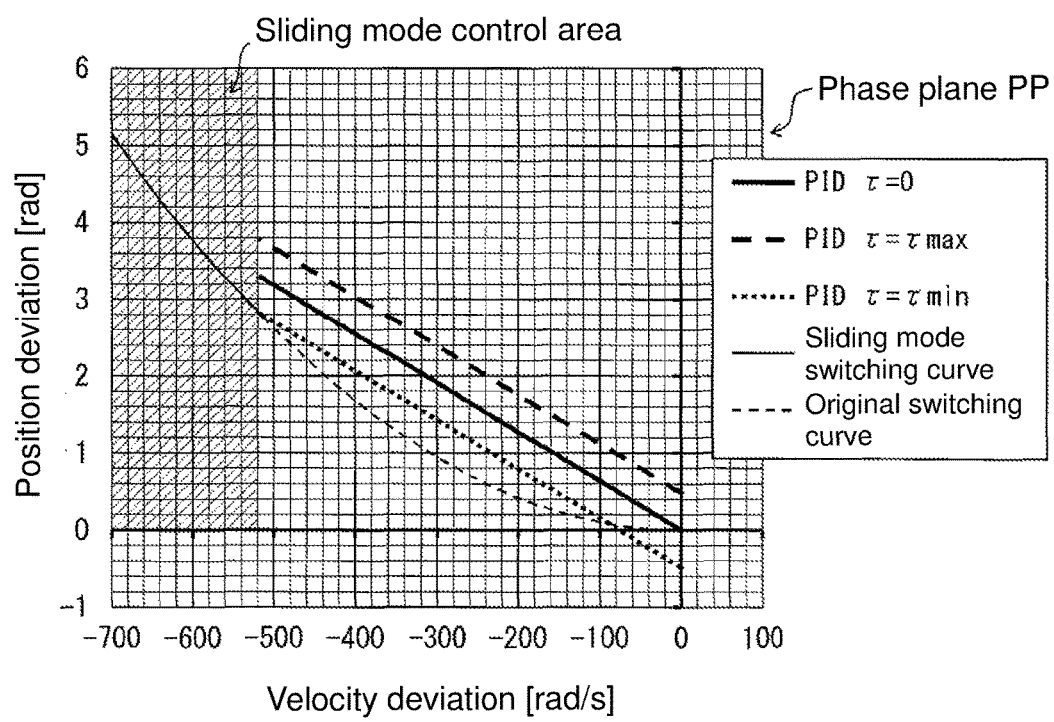
FIG. 16 is a view illustrating a switching curve of a proposed technique 3 with respect to the control device in FIG. 1.

FIG. 16 is a view illustrating the switching curve SL of the proposed technique 3 with respect to the control device 10. In the proposed technique 3 of FIG. 16, the switch 105 switches between the PID control and the sliding mode control based on a policy that "the behavior for the saturated manipulated variable becomes the fastest orbit".

The switch 105 that adopts the proposed technique 3 selects the PID controller (that is, the position controller 101 and the velocity controller 103) when the velocity deviation $v_{err}$ controlled by the PID controller is equal to or less than the second predetermined value, and the selector selects the sliding mode controller 104 when the velocity deviation $v_{err}$ controlled by the PID controller is more than the second predetermined value.

According to the above configuration, when the velocity deviation $v_{err}$ controlled by the PID controller is more than the second predetermined value, the control device 10 controls the torque of the servo motor 20 using the sliding mode controller 104, so that the time necessary to match the position and velocity of the servo motor 20 with the position command value $\theta_R$ and the velocity command value $v_R$ can be shortened, and the sliding mode control can prevent the overshoot and the hunting from occurring in the servo motor 20 or the reference model.

On the phase plane PP in FIG. 16 (the phase plane PP in which the horizontal axis indicates the velocity deviation $v_{err}$ while the vertical axis indicates the position deviation $\theta_{err}$), the switch 105 selects the sliding mode controller 104 when the velocity deviation $v_{err}$ controlled by the PID controller (that is, the position controller 101 and the velocity controller 103) is more than "velocity deviation $v_{err}$=−520 (second predetermined value)". At this point, the switching curve SL (the curve drawn as "sliding mode switching curve" in FIG. 16, the switching curve SL in the original sliding mode) that is designed as the orbit leading to the origin (that is, the position where both the position deviation $\theta_{err}$ and the velocity deviation $v_{err}$ become "0") in outputting the positive predetermined torque that can be output from the servo motor 20 outputs, the negative predetermined torque (for example, the positive maximum torque τmax that can be output from the servo motor 20, or the negative maximum torque, namely, the minimum torque τmin) and the line (that is, the straight line of (PID,τ=min)) of τmin in the area where the PID control is implemented are connected to each other at the point of "velocity deviation $v_{err}$=−520 (second predetermined value)".

That is, on the phase plane PP in FIG. 16, the switch 105 switches the PID control and the sliding mode control using directly the switching curve SL (switching plane) in the original sliding mode at the velocity deviation $v_{err}$ (in FIG.

16, the straight line of "velocity deviation $v_{err}$=−520 (second predetermined value)") at which the area (the area where the switch 105 selects the control by the PID controller (that is, the position controller 101 and the velocity controller 103)) where the PID control is implemented and the switching curve SL in the original sliding mode intersect each other.

Figure 17A:
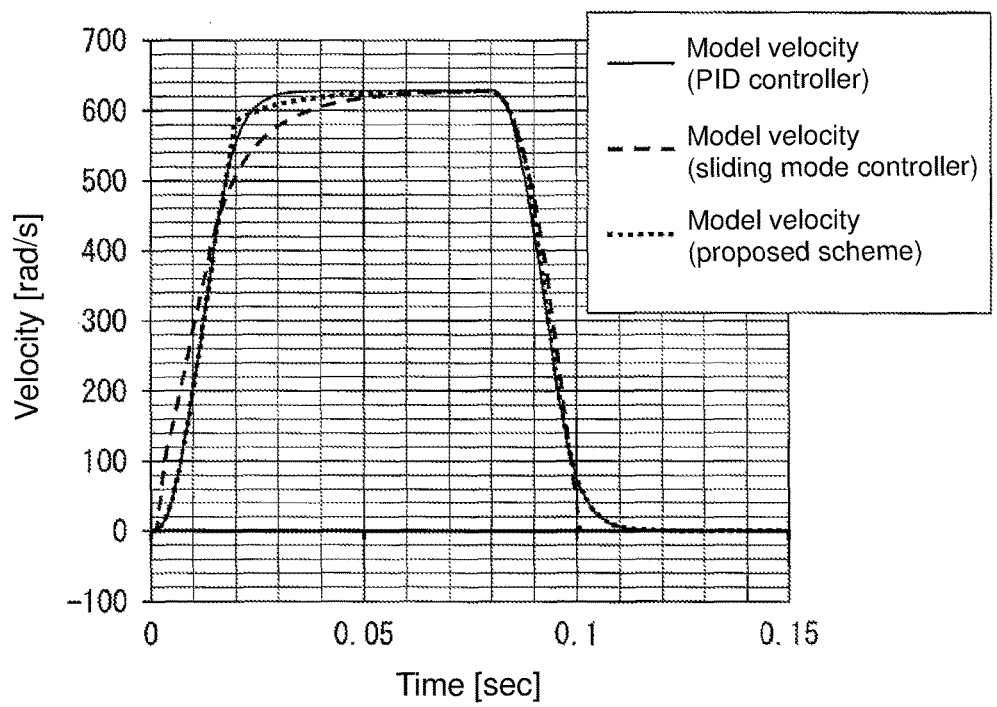
FIGS. 17A and 17B are views illustrating the loci of the controlled velocity and torque during the unsaturation of the manipulated variable, and are graphs illustrating comparison of the case of only PID control, the case of only sliding mode control, and the case that the control device in FIG. 1 implements the control using the switching curve of the proposed technique 3.
Figure 17B:
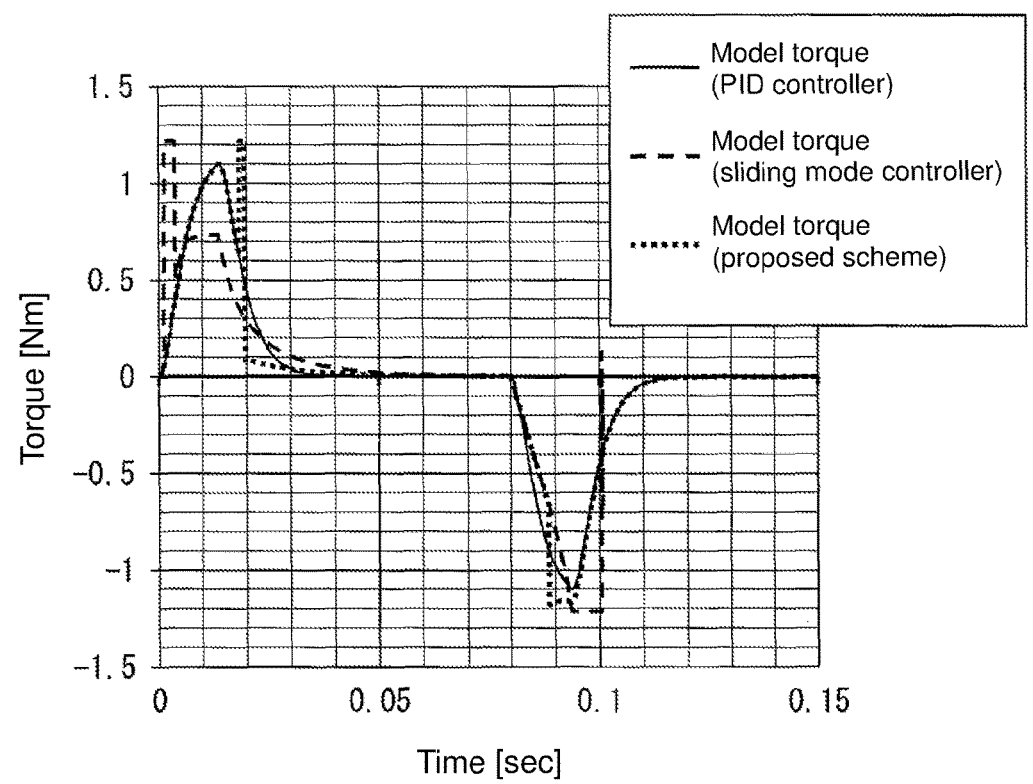

FIGS. 17A and 17B are views illustrating loci of the controlled velocity and torque during the unsaturation of the manipulated variable, and are graphs illustrating comparison of the case of only PID control, the case of only sliding mode control, and the case that the control device 10 implements the control using the switching curve SL (the switching curve SL of the original sliding mode) of the proposed technique 3.

Figure 18A:
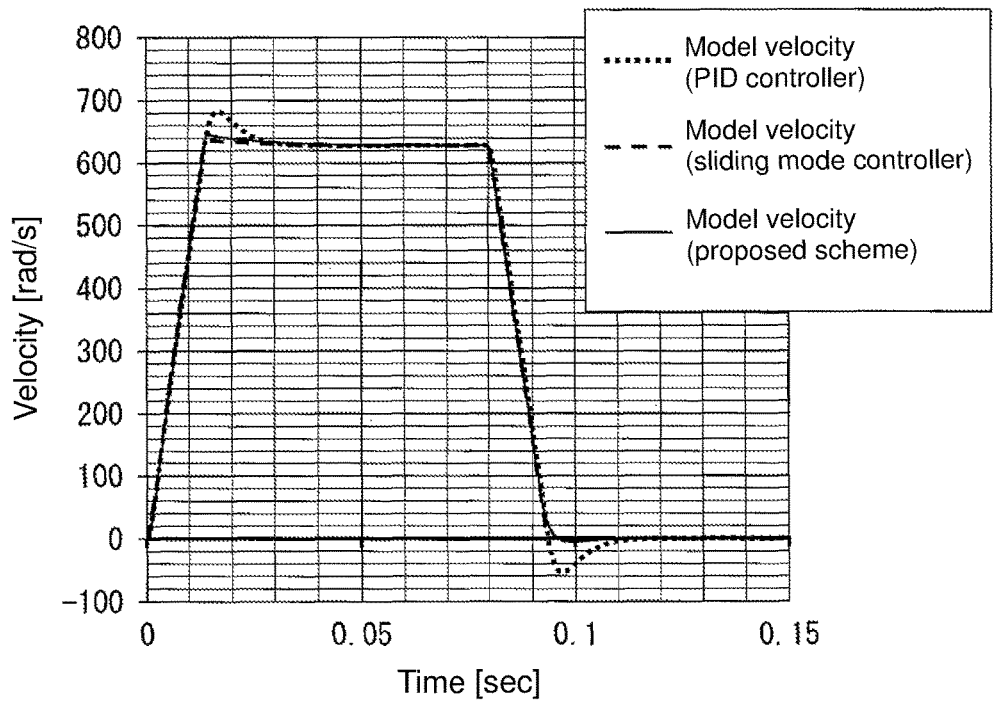
FIGS. 18A and 18B are views illustrating the loci of the controlled velocity and torque during the saturation of the manipulated variable, and are graphs illustrating comparison of the case of only PID control, the case of only sliding mode control, and the case that the control device in FIG. 1 implements the control using the switching curve of the proposed technique 3.
Figure 18B:
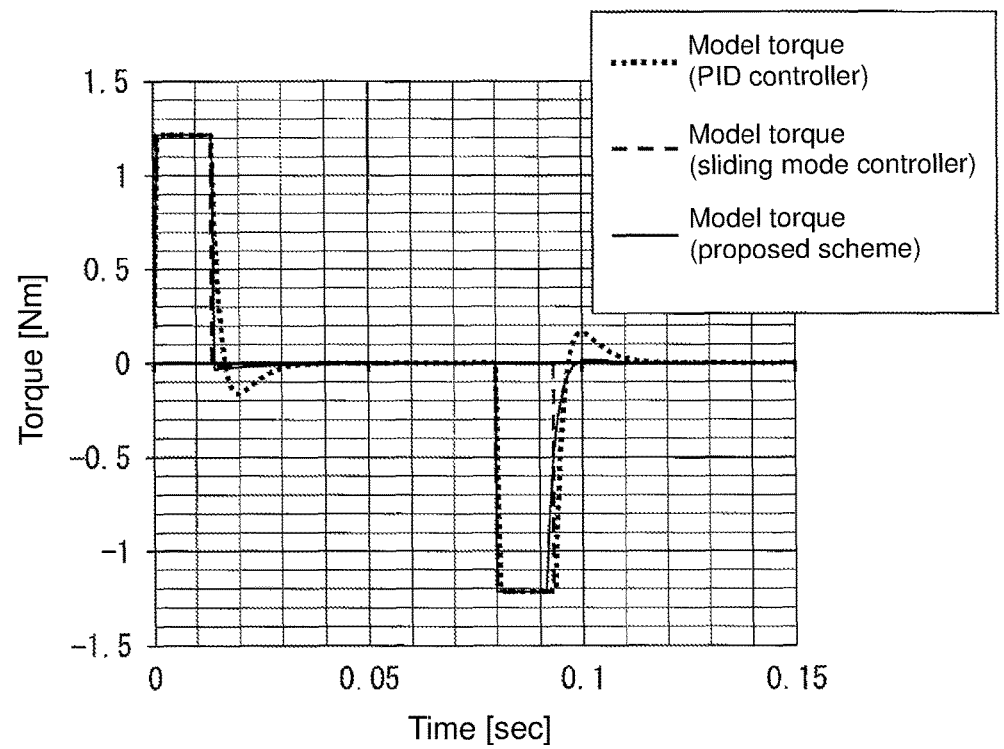

FIGS. 18A and 18B are views illustrating loci of the controlled velocity and torque during the unsaturation of the manipulated variable, and are graphs illustrating comparison of the case of only PID control, the case of only sliding mode control, and the case that the control device 10 implements the control using the switching curve SL (the switching curve SL of the original sliding mode) of the proposed technique 3.

Figure 19A:
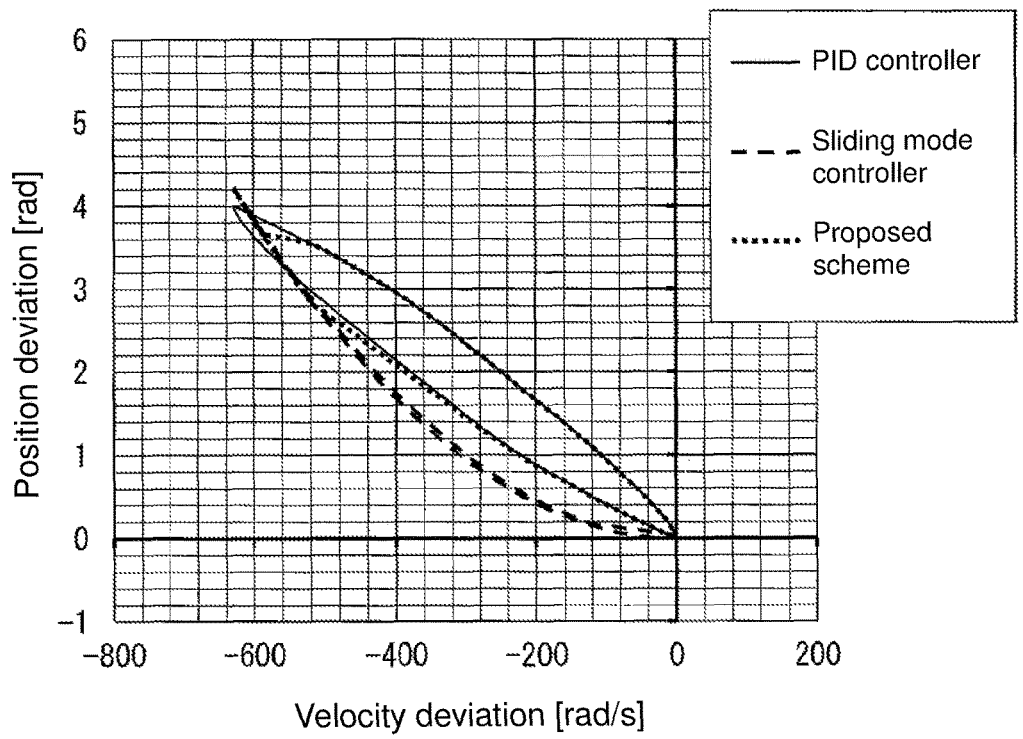
FIGS. 19A and 19B are graphs on a phase plane, in which a horizontal axis indicates a velocity deviation while a vertical axis indicates a position deviation, illustrating the comparison of the case of only the PID control, the case of only the sliding mode control, and the case that the control device in FIG. 1 implements the control using the switching curve of the proposed technique 3.
Figure 19B:
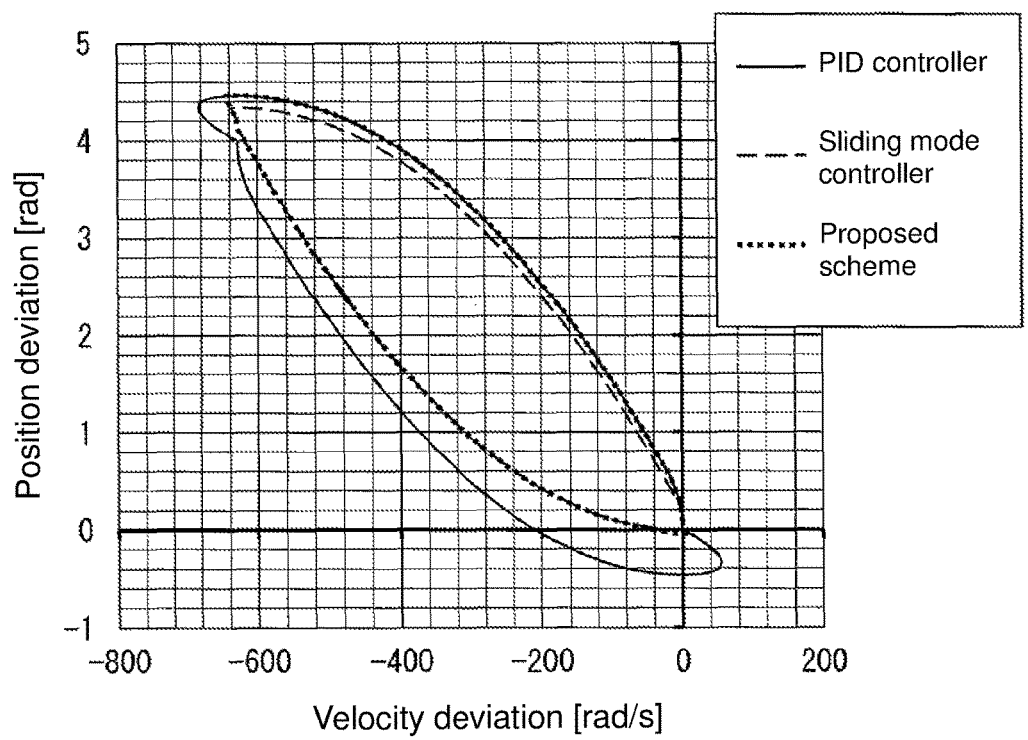

FIGS. 19A and 19B are graphs on the phase plane PP, in which a horizontal axis indicates the velocity deviation $v_{err}$ while a vertical axis indicates the position deviation $\theta_{err}$, illustrating the comparison of the case of only the PID control, the case of only the sliding mode control, and the case that the control device 10 implements the control using the switching curve SL (the switching curve SL of the original sliding mode) of the proposed technique 3.

As illustrated in FIGS. 17A to 19B, when the proposed technique 3 is adopted, in the control implemented by the control device 10, the orbit for the saturated manipulated variable is matched with the orbit for the control implemented only by the sliding mode control, namely, the orbit is the fastest (shortest). However, the area where the PID control is implemented is limited in the control implemented by the control device 10 that adopts the proposed technique 3. In the control device 10 that adopts the proposed technique 3, the manipulated variable is discontinuous because the discontinuity is generated at the point in which the area where the sliding mode control is implemented transfers to the area where the PID control is implemented.

Comparison of Proposed Techniques 1 to 3

Figure 20A:
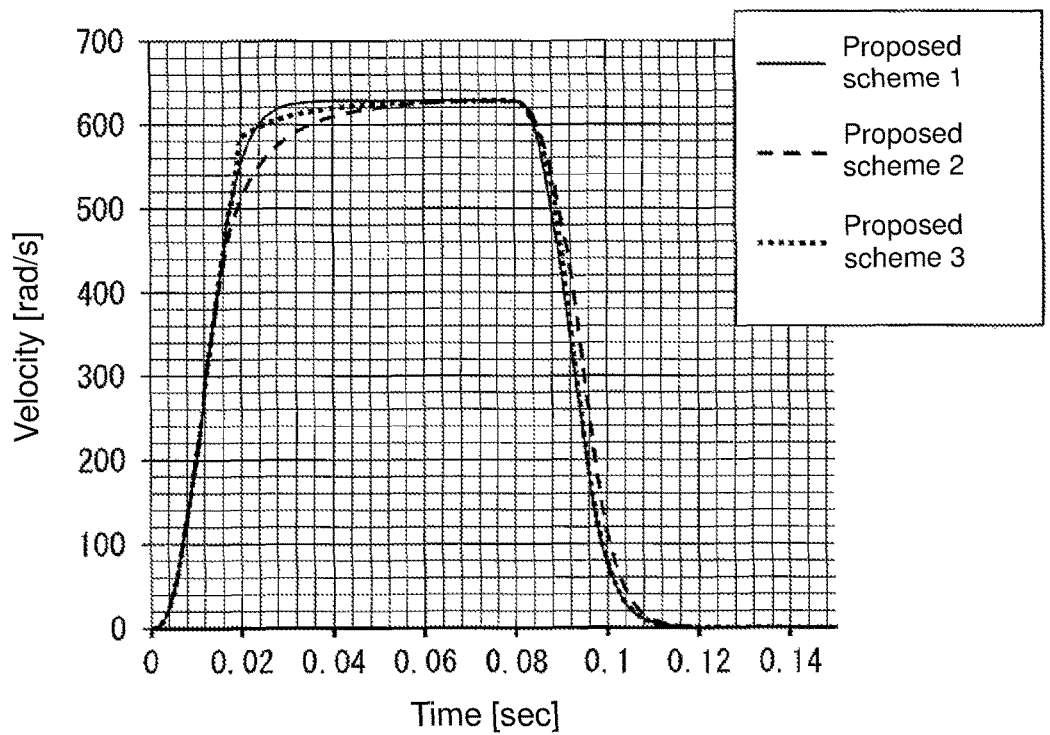
FIGS. 20A and 20B are views illustrating the loci of the controlled velocity and torque during the unsaturation of the manipulated variable, and are graphs illustrating comparison of the cases that the control device in FIG. 1 implements the control using the switching curves of the proposed technique 1, the proposed technique 2, and the proposed technique 3.
Figure 20B:
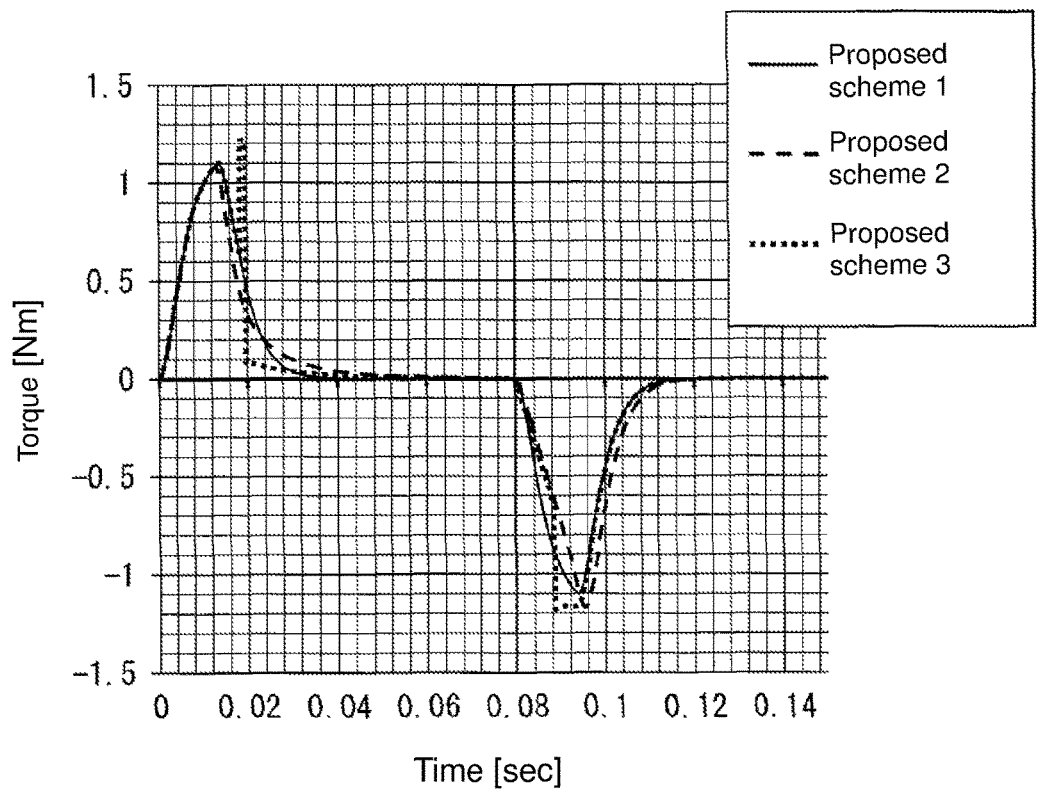

FIGS. 20A and 20B are views illustrating the loci of the controlled velocity and torque during the unsaturation of the manipulated variable, and are graphs illustrating comparison of the cases that the control device 10 implements the control using the switching curves SL of the proposed technique 1, the proposed technique 2, and the proposed technique 3.

Figure 21A:
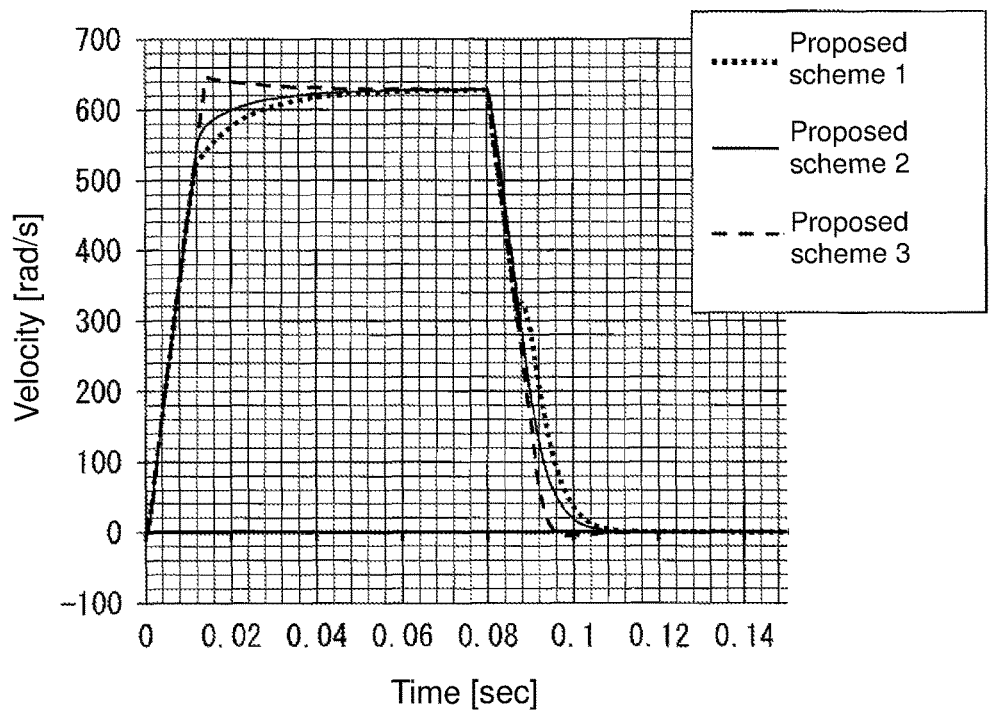
FIGS. 21A and 21B are views illustrating the loci of the controlled velocity and torque during the saturation of the manipulated variable, and are graphs illustrating the comparison of the cases that the control device in FIG. 1 implements the control using the switching curves of the proposed technique 1, the proposed technique 2, and the proposed technique 3.
Figure 21B:
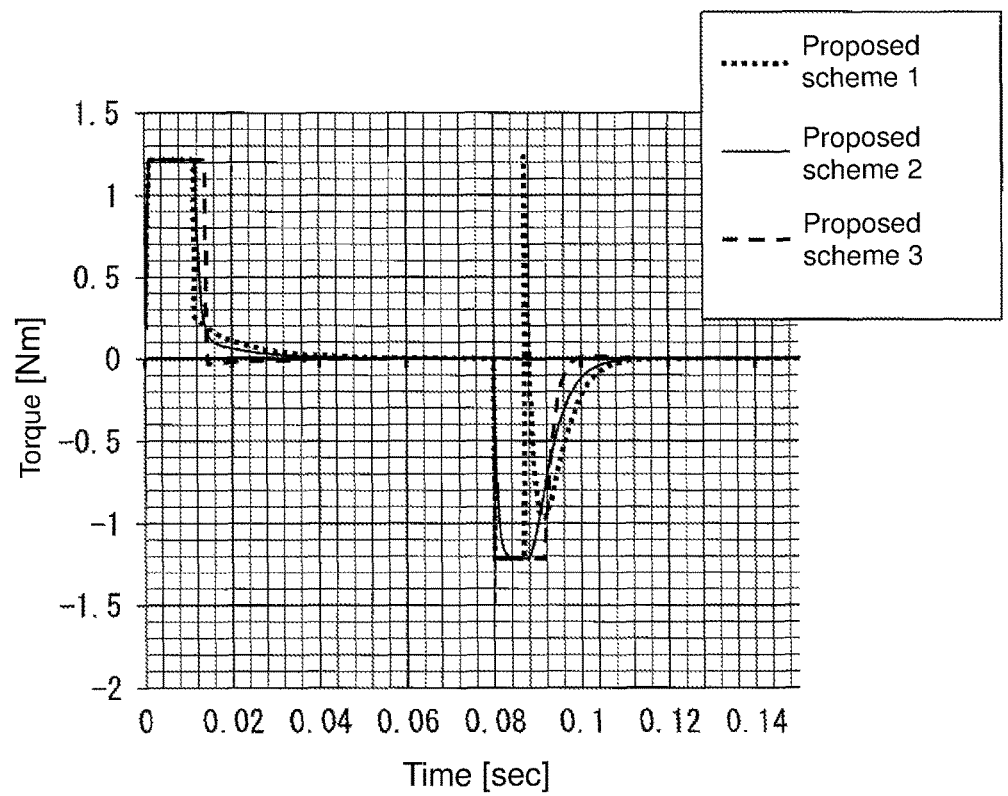

FIGS. 21A and 21B are views illustrating the loci of the controlled velocity and torque during the saturation of the manipulated variable, and are graphs illustrating comparison of the cases that the control device 10 implements the control using the switching curves SL of the proposed technique 1, the proposed technique 2, and the proposed technique 3.

Figure 22A:
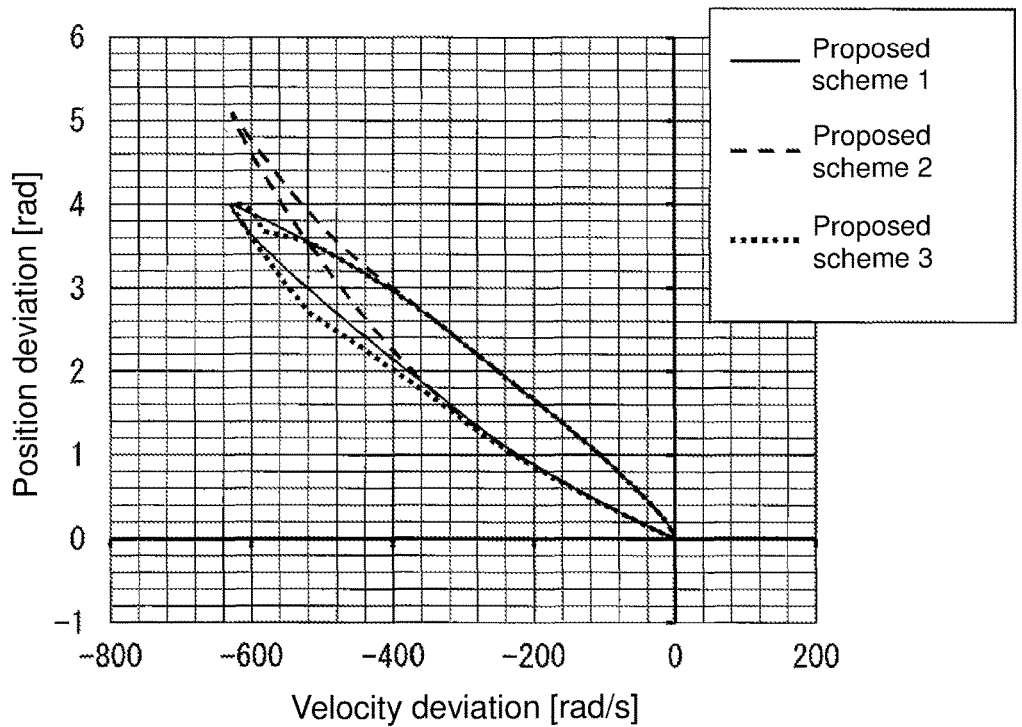
FIGS. 22A and 22B are graphs on the phase plane, in which the horizontal axis indicates the velocity deviation while the vertical axis indicates the position deviation, illustrating the comparison of the cases that the control device in FIG. 1 implements the control using the switching curves of the proposed technique 1, the proposed technique 2, and the proposed technique 3.
Figure 22B:
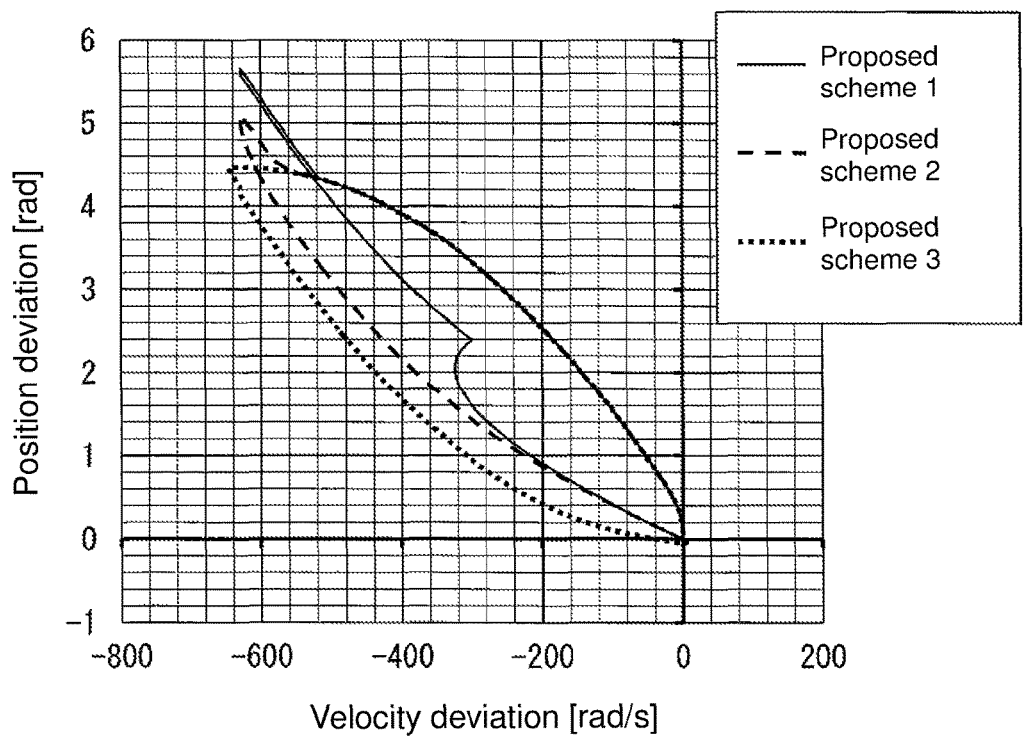

FIGS. 22A and 22B are graphs on the phase plane PP, in which the horizontal axis indicates the velocity deviation $v_{err}$ while the vertical axis indicates the position deviation $\theta_{err}$, illustrating the comparison of the cases that the control device 10 implements the control using the switching curves SL of the proposed technique 1, the proposed technique 2, and the proposed technique 3;

As illustrated in FIGS. 20A to 22B, in each of the proposed techniques 1 to 3, the occurrence of the overshoot and the hunting can be prevented even if the manipulated variable is saturated, namely, even if the output torque (the model torque of the servo motor 20 controlled by the control device 10) of the control device 10 is saturated.

Limit of Model Output Torque According to Model Output Velocity

Because the maximum output velocity of the servo motor 20 (that is, the real servo motor 20R) is fixed, it is undesirable that the velocity of the servo motor 20 controlled by the sliding mode controller 104 or the PID controller (that is, the position controller 101 and the velocity controller 103) is more than the maximum output velocity. That is, in the control device 10, the velocity of the servo motor 20 controlled by the sliding mode controller 104 or the PID controller is less than the maximum output velocity of the servo motor 20 (that is, the real servo motor 20R).

According to the above configuration, in the control device 10, the velocity of the servo motor 20 controlled by the sliding mode controller 104 or the PID controller (the position controller 101 and the velocity controller 103) is less than the maximum output velocity of the servo motor 20.

At this point, when a velocity more than the maximum output of the servo motor 20 is set to the velocity of the servo motor 20 controlled by the sliding mode controller 104 or the PID controller, the servo motor 20 does not follow.

The velocity of the servo motor 20 controlled by the sliding mode controller 104 or the PID controller is less than the maximum output velocity of the servo motor 20, so that the control device 10 can control the servo motor 20 using the controlled velocity that can be followed by the servo motor 20.

Specifically, assuming that va is a "threshold at which velocity limiting is started" and that vb is a "velocity limiting value" (for example, the maximum output velocity of the servo motor 20 (that is, the real servo motor 20R)), the sliding mode controller 104 or the PID controller (that is, the position controller 101 and the velocity controller 103) limit the output, namely, the torque controlled by the sliding mode controller 104 or the PID controller according to the velocity of the servo motor 20 controlled by the sliding mode controller 104 or the PID controller as shown in the following model output torque calculating method. In the following model output torque calculating method, a "model output velocity $v_{model}$" indicates "the velocity of the servo motor 20 controlled by the sliding mode controller 104 or the PID controller (that is, the position controller 101 and the velocity controller 103)". A "model output torque $\tau_{model}$" indicates "the torque of the servo motor 20 controlled by the sliding mode controller 104 or the PID controller (that is, the position controller 101 and the velocity controller 103)".

Model Output Calculating Method

1. For $v_{model} \times \tau_{model} \leq$ (the case that the model output velocity comes close to "0")

or for $|v_{model}| < v_a$

The model output torque is not limited.

2. The case that $v_a < |v_{model}| < v_b$ is obtained for $v_{model} \times \tau_{model} > 0$ $$\tau'_{model} = \tau_{model} \times \frac{v_b - |v_{model}|}{v_a} \times 10$$

(The buffer area is generated such that the model output torque becomes 100% for $|v_{model}|=v_a$ and such that the model output torque becomes 0% for $|v_{model}|=v_b$ 3. The case that $|v_{model}| \geq v_b$ is obtained for $v_{model} \times \tau_{model} > 0$ $$\tau'_{model} = -1 \times \text{sign}(v_{model}) \times \frac{J}{\Delta t}(v_b - |v_{model}|)$$

Figure 23:
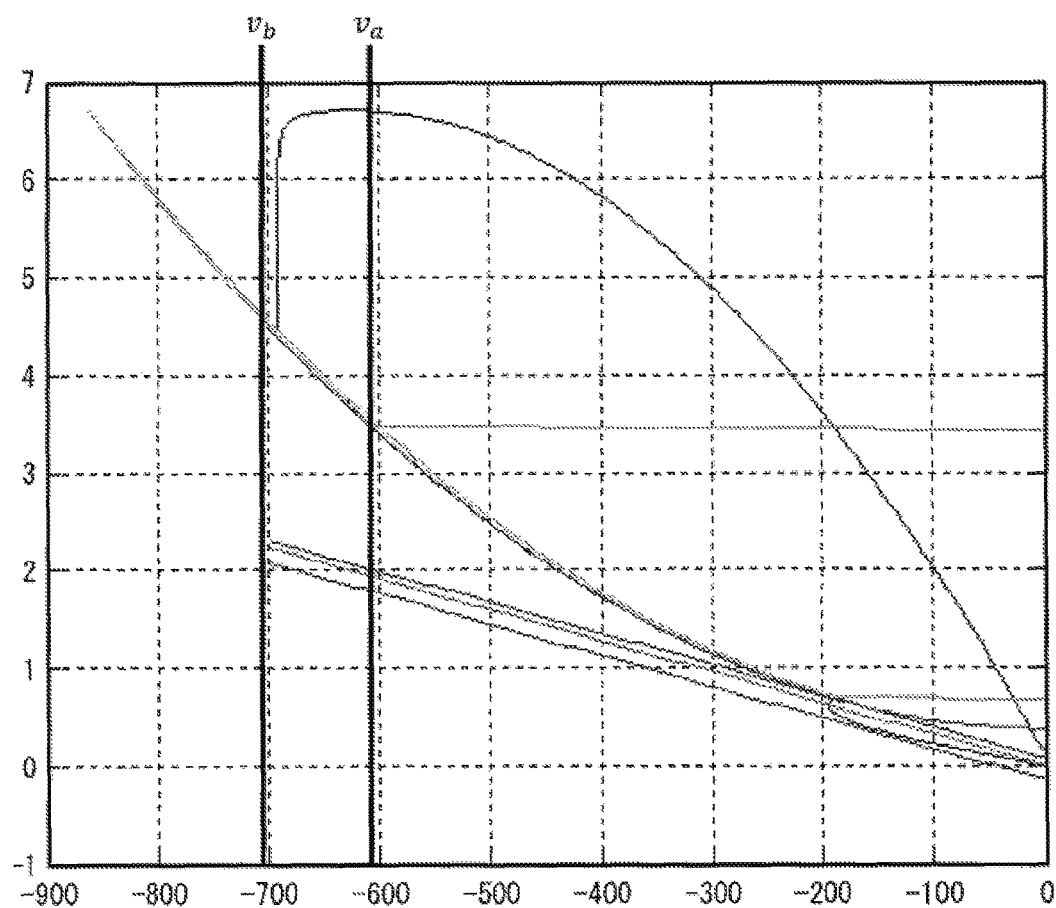
FIG. 23 is a view, assuming that va is a "threshold at which velocity limiting is started" and that vb is a "velocity limiting value", illustrating the case that a model output torque is limited by the sliding mode control according to a model output velocity.

FIG. 23 is a view, assuming that va is "a threshold at which the velocity limiting is started" and that vb is "the velocity limiting value", illustrating the case that a model output torque $\tau_{model}$ is limited according to a model output velocity $v_{model}$. As illustrated in FIG. 23, the sliding mode controller 104 or the PID controller (that is, the position controller 101 and the velocity controller 103) implement the following control such that the velocity (model output velocity $v_{model}$) of the servo motor 20 controlled by the sliding mode controller 104 or the PID controller is not more than the velocity limiting value vb indicating the maximum output velocity of the servo motor 20. That is, when the model output velocity $v_{model}$ reaches "the threshold va at which the velocity limiting is started", the sliding mode controller 104 or the PID controller (that is, the position controller 101 and the velocity controller 103) limit the output (model output torque $\tau_{model}$) to set the model output velocity $v_{model}$ to the velocity limiting value vb or less. The switch 105 or the torque limiter 106 may limit the model output torque $\tau_{model}$ according to the model output velocity $v_{model}$.

Implementable Example by Software

The control block (particularly, the position controller 101, the velocity command generator 102, the velocity controller 103, the sliding mode controller 104, the switch 105, the torque limiter 106, and the velocity detector 107) of the control device 10 may be constructed with a logic circuit (hardware) formed in an integrated circuit (IC chip), or implemented by software using a central processing unit (CPU).

In the latter case, the control device 10 includes the CPU that executes a command of the program that is of software implementing each function, a read only memory (ROM) or storage device (referred to as a "recording medium") in which the program and various pieces of data are readably stored, and a random access memory (RAM) in which the program is expanded. The computer (or the CPU) reads the program from the recording medium to execute the program, thereby achieving the object of the present invention. A "non-transient physical medium" such as a tape, a disk card, a semiconductor memory, and a programmable logic circuit can be used as the recording medium. The program may be supplied to the computer through any transmission medium, such as a communication network and a broadcasting wave, which can transmit the program. The present invention can be implemented even in a mode of a data signal. The data signal is embedded in a carrier wave, and the program is provided by electronic transmission in the data signal.

The present invention is not limited to the embodiments, but various changes can be made without departing from the scope of the present invention. It is noted that the embodiment obtained by a combination of different embodiments is also included in the scope of the present invention.

The invention claimed is:

1. A control device for controlling a servo motor or a reference model servo motor to be used for implementing model following control on the servo motor,
the control device comprising:
a sliding mode controller configured to implement sliding mode control that determines a torque to be output to the servo motor such that a position deviation indicating a deviation of a position of the servo motor from an externally input position command value and a velocity deviation indicating a deviation of a velocity of the servo motor from an externally input velocity command value converge onto a switching curve determined from a predetermined torque that can be output from the servo motor and a motion characteristic of a load machine to be driven by the servo motor;
a proportional-integral-derivative (PID) controller configured to implement PID control such that the position and velocity of the servo motor follow the position command value and velocity command value; and
a selector configured to select the control by the sliding mode controller or the control by the PID controller, based on at least one of the position deviation and the velocity deviation.

2. The control device according to claim 1, wherein
the sliding mode controller and the PID controller are configured to control the reference model servo motor,
the control device further comprising
a feedback controller configured to implement the PID control on the actual position and velocity of the servo motor such that the actual position and velocity of the servo motor follow a position and velocity of the reference model servo motor to be controlled by the sliding mode controller or the PID controller selected by the selector.

3. The control device according to claim 1, wherein
the selector selects the PID controller when the torque controlled by the PID controller is equal to or less than a first predetermined value or when the velocity deviation is equal to or less than a second predetermined value, and
the selector selects the sliding mode controller when the torque controlled by the PID controller is more than the first predetermined value or when the velocity deviation is more than the second predetermined value.

4. The control device according to claim 3, wherein
the first predetermined value is a maximum torque output from the servo motor,
the selector selects the PID controller when the torque output from the PID controller is equal to or less than the maximum torque of the servo motor, and
the selector selects the sliding mode controller when the torque output from the PID controller is more than the maximum torque.

5. The control device according to claim 4, wherein
the selector translates the switching curve such that the switching curve is in contact with a straight line drawn on a phase plane, in which a vertical axis indicates the position deviation while a horizontal axis indicates the velocity deviation, when the torque controlled by the PID controller is the maximum torque, and causes the sliding mode controller to implement the sliding mode control such that the position deviation and the velocity deviation converge onto the translated switching curve.

6. The control device according to claim 3, wherein
in the case where the velocity deviation controlled by the PID controller is equal to or less than the second predetermined value, the selector selects the PID controller, and
in the case where the velocity deviation controlled by the PID controller is more than the second predetermined value, the selector translates the switching curve such that the switching curve is in contact with a straight line drawn on a phase plane, in which a vertical axis indicates the position deviation while a horizontal axis indicates the velocity deviation, when the torque controlled by the PID controller is zero at a place where the velocity deviation is the second predetermined value, and causes the sliding mode controller to implement the sliding mode control such that the position deviation and the velocity deviation converge onto the translated switching curve.

7. The control device according to claim 6, wherein a buffer area is an area sandwiched between a minimally-translated translation switching curve and a maximally-translated switching curve, the minimally-translated translation switching curve and the maximally-translated switching curve being obtained by translating the switching curve such that the switching curve is in contact with a minimum torque straight line and a maximum torque straight line at a place where the velocity deviation is the second predetermined value, respectively, the minimum torque straight line being a straight line drawn on the phase plane when the torque controlled by the PID controller is a minimum torque output from the servo motor, the maximum torque straight line being a straight line drawn on the phase plane when the torque controlled by the PID controller is a maximum torque output from the servo motor.

8. The control device according to claim 3, wherein the selector selects the PID controller when the velocity deviation controlled by the PID controller is equal to or less than the second predetermined value, and the selector selects the sliding mode controller when the velocity deviation controlled by the PID controller is more than the second predetermined value.

9. The control device according to claim 1, wherein the velocity command value is zero.

10. The control device according to claim 1, wherein the velocity of the servo motor controlled by the sliding mode controller or the PID controller is less than a maximum output velocity of the servo motor.

11. A control method for controlling a servo motor or a reference model servo motor to be used for implementing model following control on the servo motor,
the control method comprising:
a sliding mode control step of implementing sliding mode control that determines a torque to be output to the servo motor such that a position deviation indicating a deviation of a position of the servo motor from an externally input position command value and a velocity deviation indicating a deviation of a velocity of the servo motor from an externally input velocity command value converge onto a switching curve determined from a predetermined torque that can be output from the servo motor and a motion characteristic of a load machine to be driven by the servo motor;
a PID control step of implementing PID control such that the position and velocity of the servo motor follow the position command value and velocity command value; and
a selection step of selecting the control in the sliding mode control step or the control in the PID control step for the torque of the servo motor, based on the position deviation and velocity deviation of the servo motor.

12. A non-transitory computer-readable medium storing an information processing program which, when executed, causes a computer to act as the control device according to claim 1,
the information processing program causing the computer to act as each of the parts of the control device.

* * * * *